US012336942B2

(12) United States Patent
Dewert

(10) Patent No.: US 12,336,942 B2
(45) Date of Patent: Jun. 24, 2025

(54) SUPPORT DEVICE ADJUSTABLE BY AN ELECTRIC MOTOR

(71) Applicant: de Werth Group AG, Zürich (CH)

(72) Inventor: Eckhart Dewert, Goldingen (CH)

(73) Assignee: de Werth Group AG, Zurich (CH)

( * ) Notice: Subject to any disclaimer, the term of this patent is extended or adjusted under 35 U.S.C. 154(b) by 40 days.

(21) Appl. No.: 17/394,510

(22) Filed: Aug. 5, 2021

(65) Prior Publication Data

US 2022/0168162 A1 Jun. 2, 2022

(30) Foreign Application Priority Data

| | | |
|---|---|---|
| Aug. 12, 2020 | (DE) | 20 2020 104 670.5 |
| Aug. 27, 2020 | (DE) | 20 2020 104 959.3 |
| Apr. 1, 2021 | (DE) | 10 2021 108 345.1 |
| Apr. 1, 2021 | (DE) | 20 2021 101 760.0 |
| Aug. 2, 2021 | (DE) | 10 2021 119 984.0 |

(51) Int. Cl.

| | |
|---|---|
| ***A61G 7/005*** | (2006.01) |
| ***A47C 19/00*** | (2006.01) |
| ***A47C 19/02*** | (2006.01) |
| ***A47C 19/22*** | (2006.01) |
| ***A47C 20/04*** | (2006.01) |
| ***A61G 7/018*** | (2006.01) |

(52) U.S. Cl.

CPC ............ *A61G 7/005* (2013.01); *A61G 7/018* (2013.01); *A47C 19/00* (2013.01); *A47C 19/02* (2013.01); *A47C 19/22* (2013.01); *A47C 20/041* (2013.01)

(58) Field of Classification Search

CPC ...... A61G 7/005; A61G 7/018; A47C 20/041; A47C 19/00; A47C 19/02; A47C 19/22; A47C 21/00; A47C 20/04

See application file for complete search history.

(56) References Cited

U.S. PATENT DOCUMENTS

| | | | |
|---|---|---|---|
| 5,528,948 | A | 6/1996 | De Gelis |
| 6,742,205 | B2 | 6/2004 | Dewert |
| 6,754,922 | B2 | 6/2004 | Dewert |
| 6,961,971 | B2 | 11/2005 | Schneider et al. |
| 7,198,325 | B2 | 4/2007 | Dewert |
| 7,386,901 | B2 | 6/2008 | Dewert |
| 7,404,603 | B2 | 7/2008 | Dewert |

(Continued)

FOREIGN PATENT DOCUMENTS

| | | |
|---|---|---|
| DE | 38 42 078 | 7/1989 |
| DE | 100 46 751 A1 | 7/2001 |

(Continued)

*Primary Examiner* — David R Hare

*Assistant Examiner* — Deborah Talitha Gedeon

(74) *Attorney, Agent, or Firm* — Fresh IP PLC; Terrence L. B. Brown

(57) ABSTRACT

A support device adjustable by an electric motor for supporting a mattress of a bed. The support device is flat and supports the mattress on the bed. The support device has a base part and a support part which is connected to the base part, so as to be pivotable about a support part pivot axis. There is an electric motor drive unit which is in operative connection with the base part and the support part for the pivoting adjustment of the support part relative to the base part. A stand-up lever arrangement is arranged in a drive train between the drive unit and the support part.

10 Claims, 40 Drawing Sheets

(56) References Cited

U.S. PATENT DOCUMENTS

Figure 2:
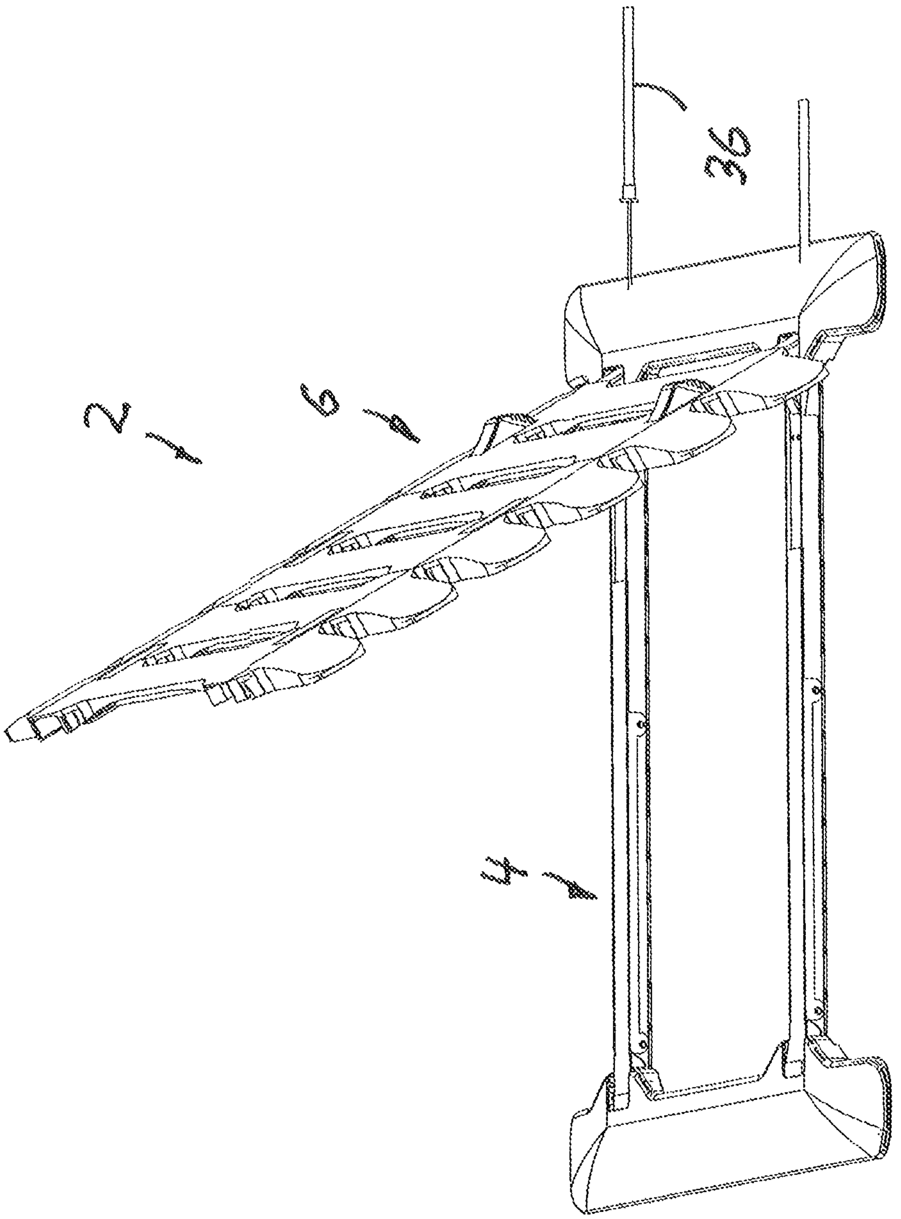

| | | | | |
|---|---|---|---|---|
| 7,484,257 | B2 | 2/2009 | Schneider et al. | |
| 7,861,610 | B2 | 1/2011 | Dewert | |
| 8,479,332 | B2 | 7/2013 | Dewert et al. | |
| 8,973,185 | B2 | 3/2015 | Dewert | |
| 9,877,589 | B2 | 1/2018 | Dewert | |
| 9,980,575 | B2 | 5/2018 | Dewert et al. | |
| 10,010,464 | B2 | 7/2018 | Dewert | |
| 10,463,162 | B2 | 11/2019 | Dewert | |
| 10,477,977 | B2 | 11/2019 | Dewert | |
| 2003/0052238 | A1 | 3/2003 | Schneider et al. | |
| 2004/0020316 | A1 | 2/2004 | Dewert | |
| 2008/0121852 | A1 | 5/2008 | Koch | |
| 2015/0074908 | A1 | 3/2015 | Dewert | |
| 2016/0015583 | A1 | 1/2016 | Dewert | |
| 2016/0157623 | A1 | 6/2016 | Dewert | |
| 2017/0332798 | A1* | 11/2017 | Dewert | A47C 20/041 |
| 2017/0332800 | A1* | 11/2017 | Dewert | A61G 7/018 |

FOREIGN PATENT DOCUMENTS

| | | | | |
|---|---|---|---|---|
| DE | 100 46 750 | C1 | 4/2002 | |
| DE | 20 2004 020 384 | U1 | 6/2005 | |
| DE | 102014115125 | A1 * | 5/2016 | A47C 20/041 |
| EP | 0 372 032 | | 11/1989 | |
| EP | 3 009 052 | | 4/2016 | |
| EP | 3 009 052 | A1 | 4/2016 | |
| WO | WO 89/10715 | | 11/1989 | |

* cited by examiner

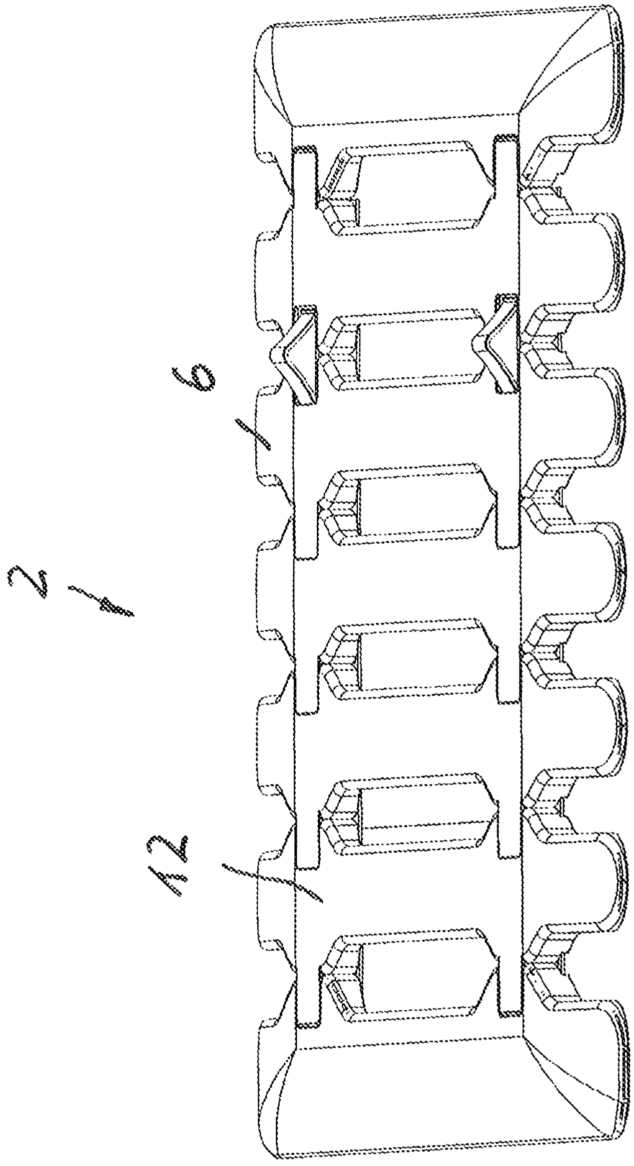
Fig. 1.1

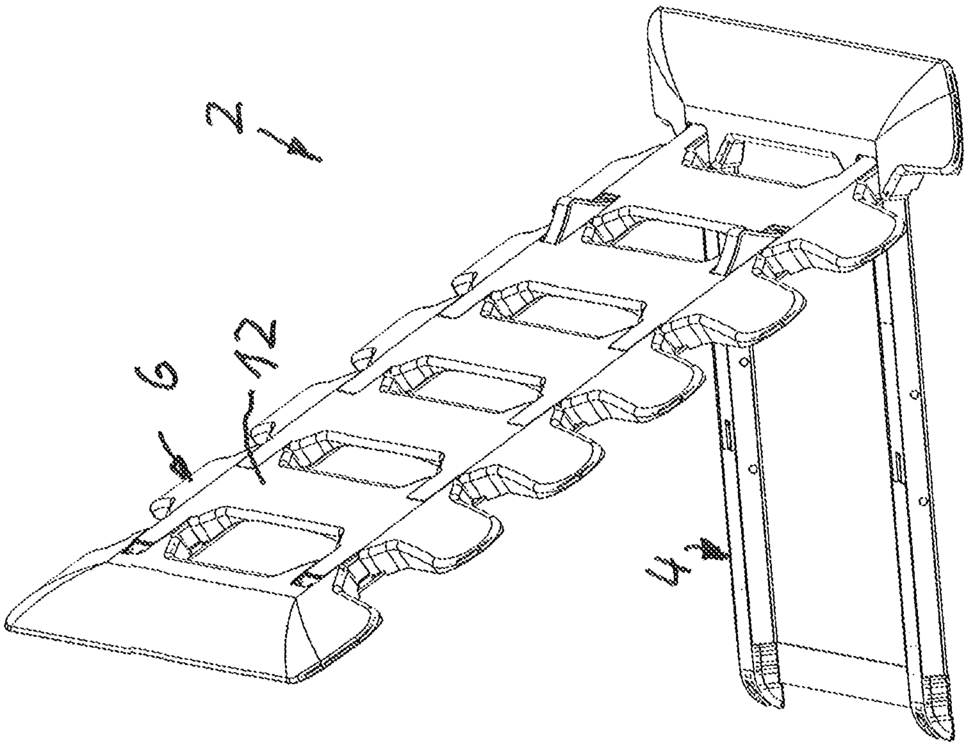
Fig 1.2

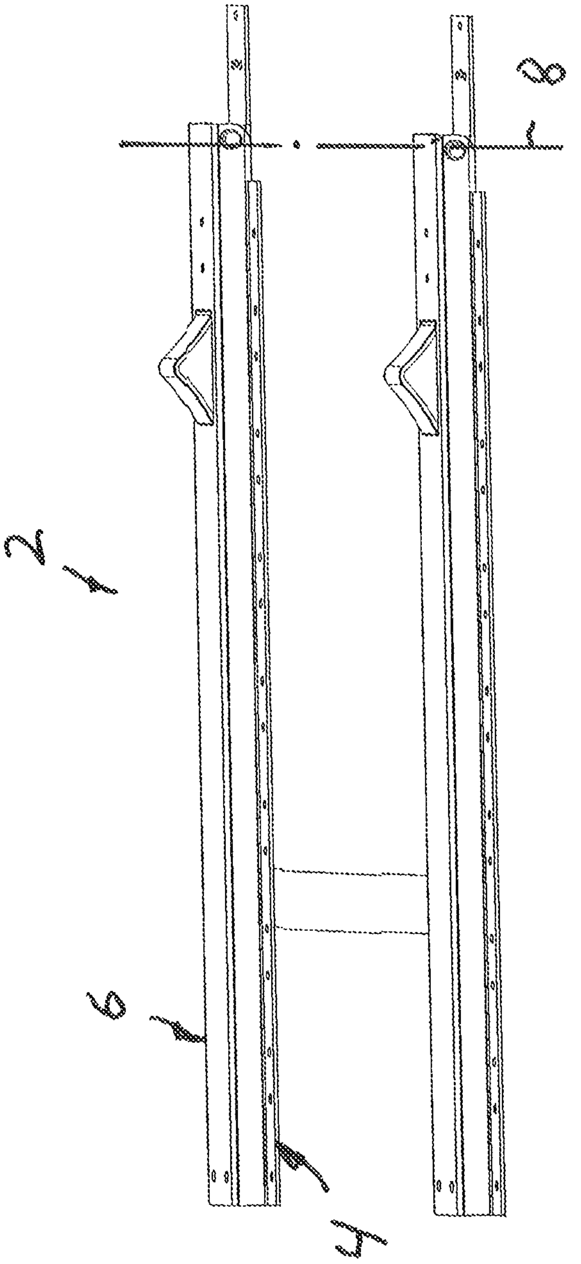
Fig. 1.3

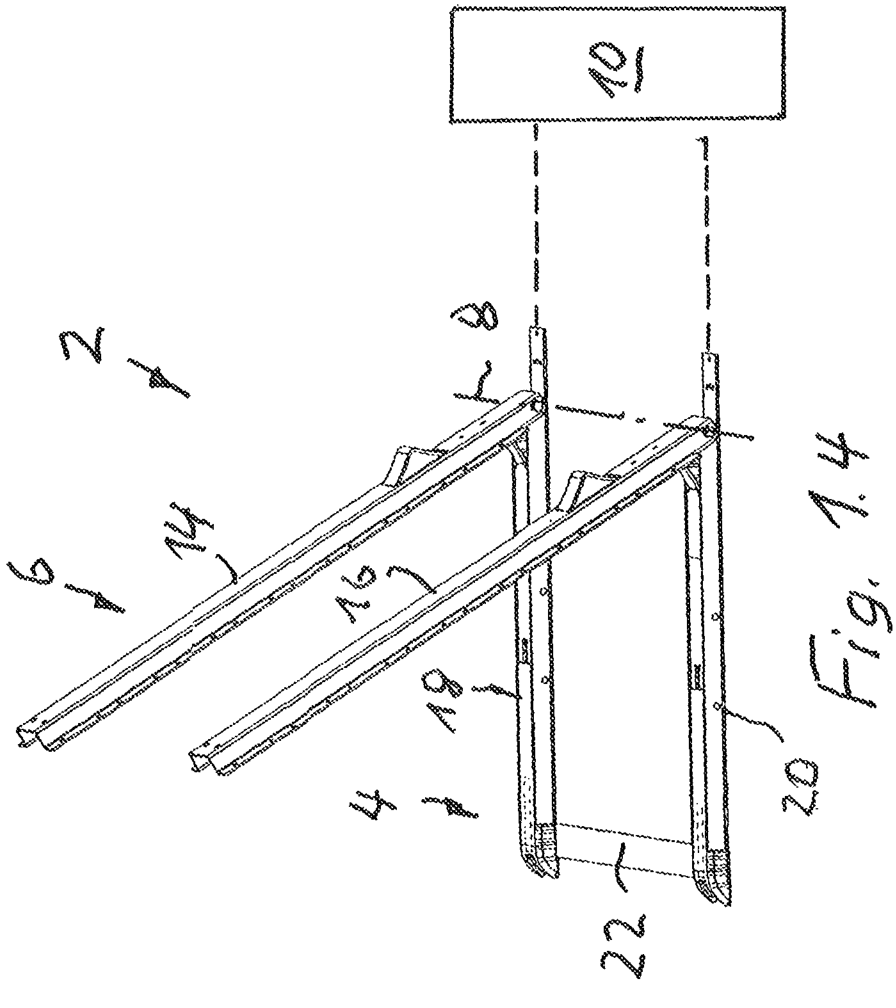
Fig. 1.4

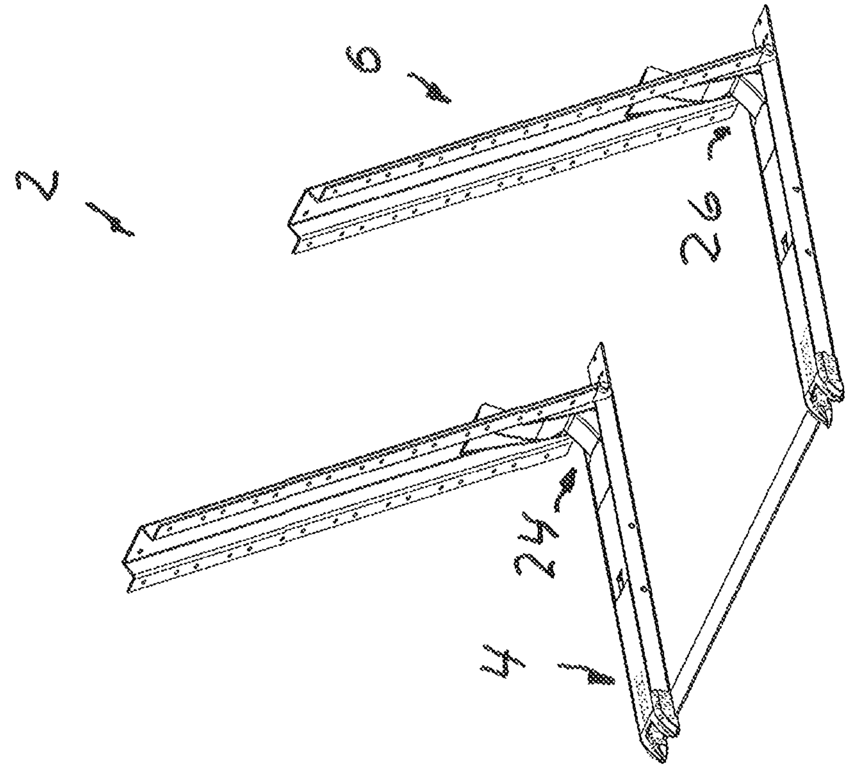
Fig. 1.5

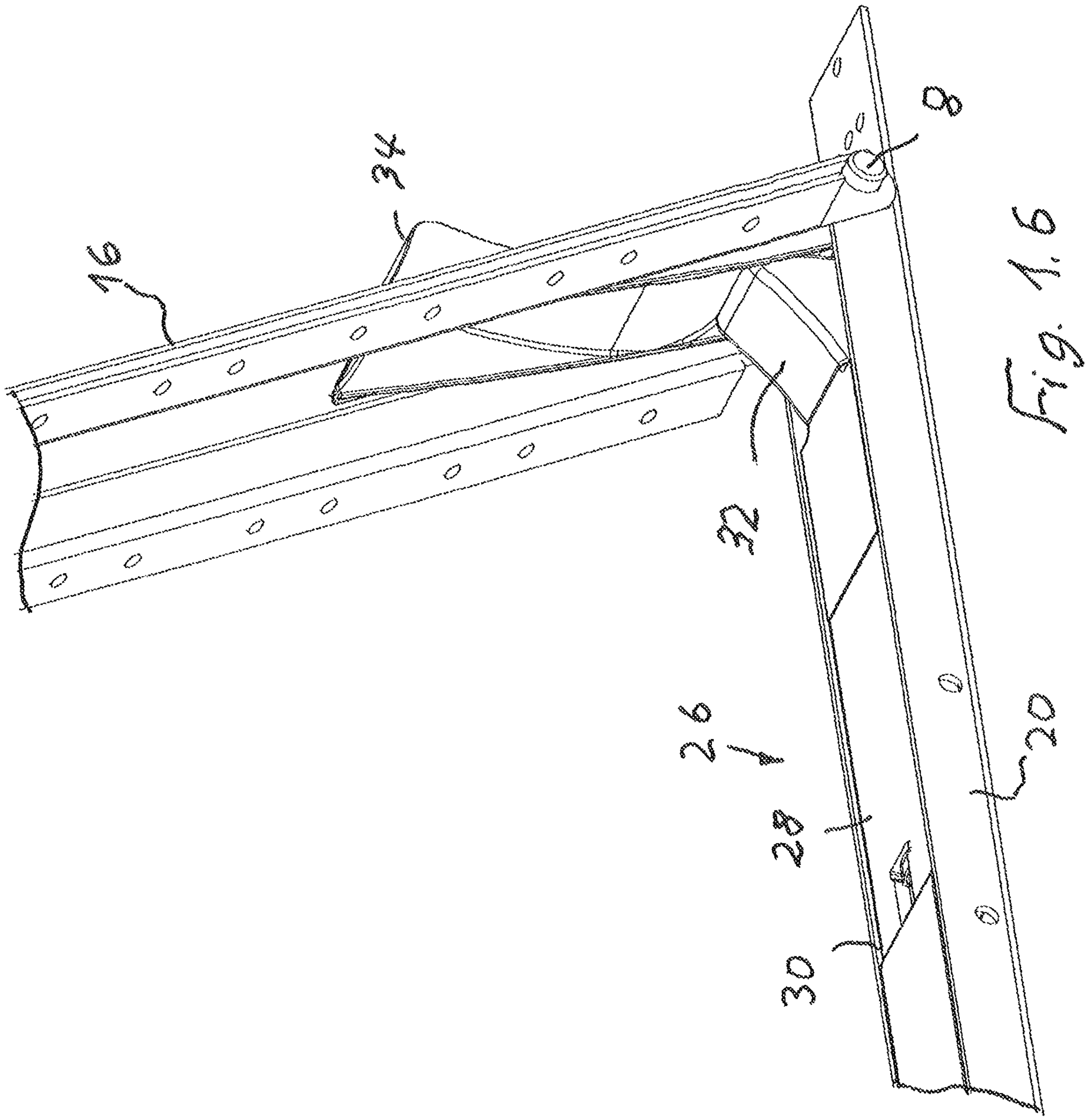
Fig. 1.6

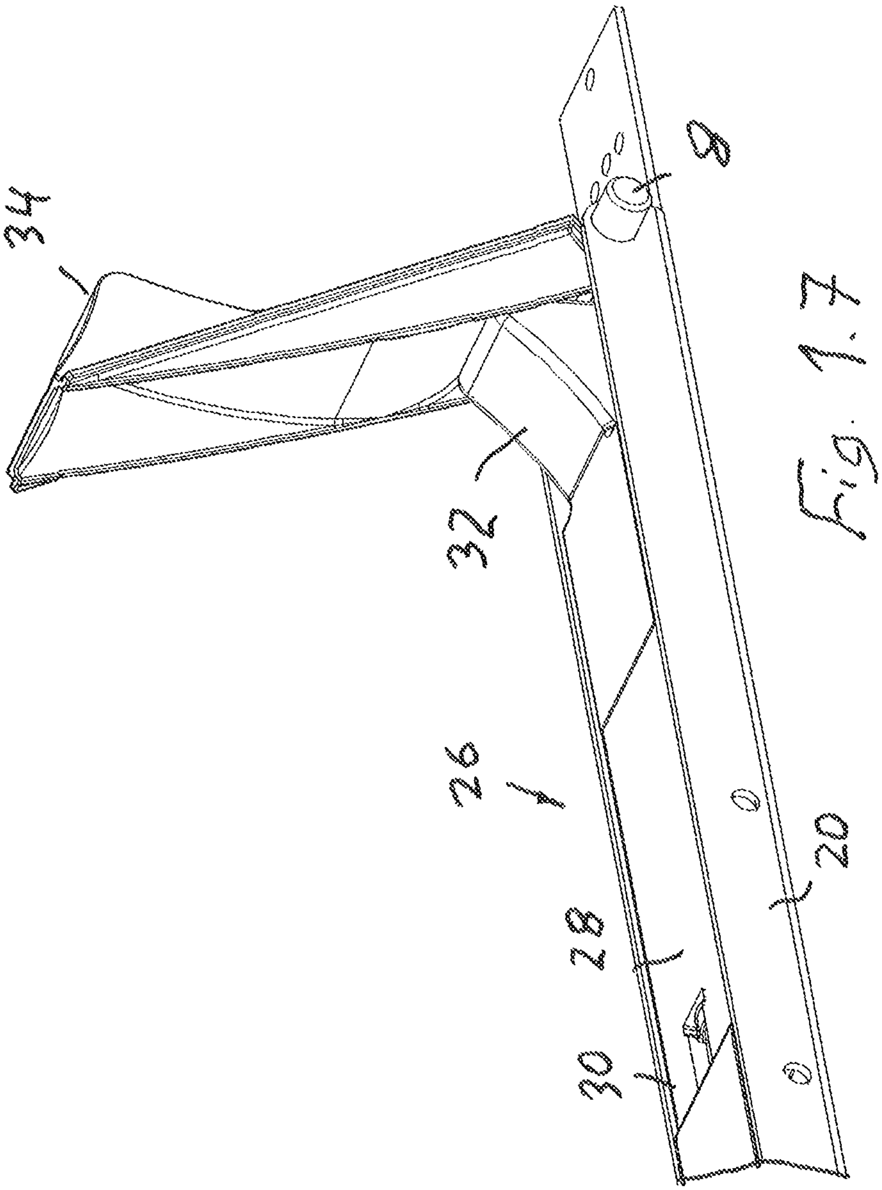
Fig. 1.7

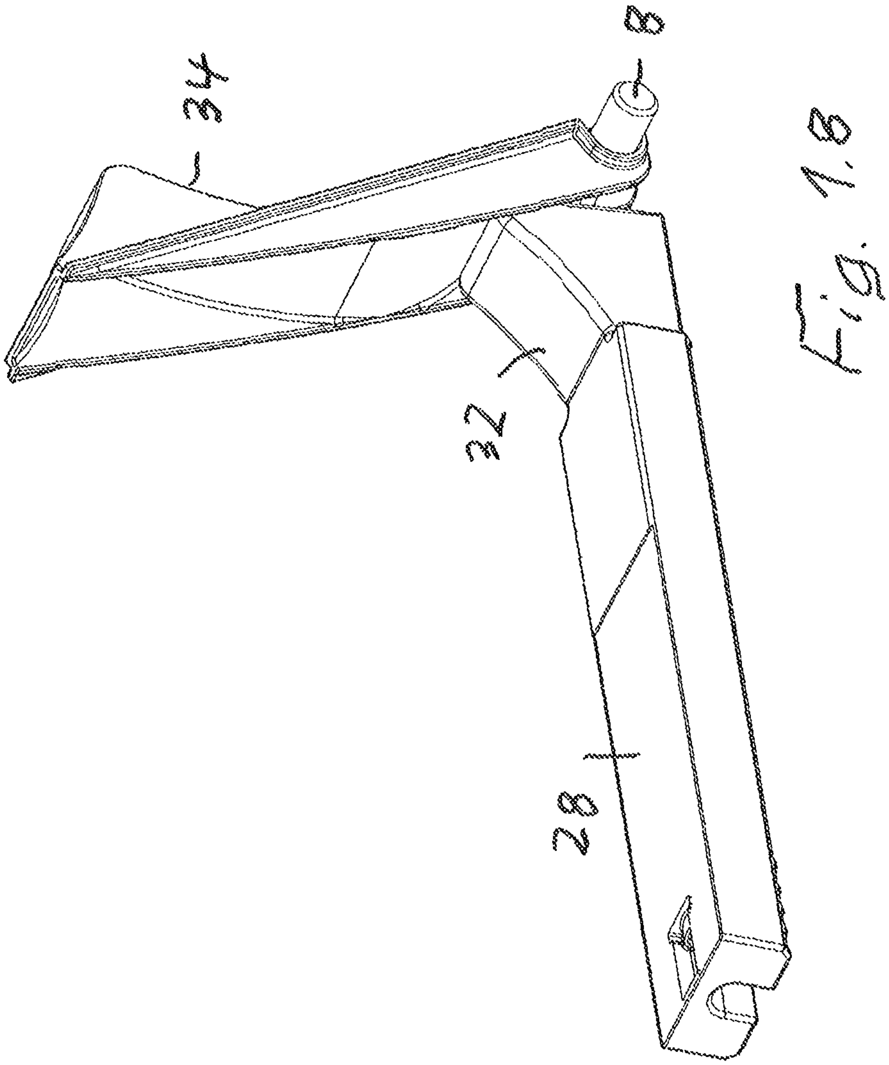
Fig. 1.8

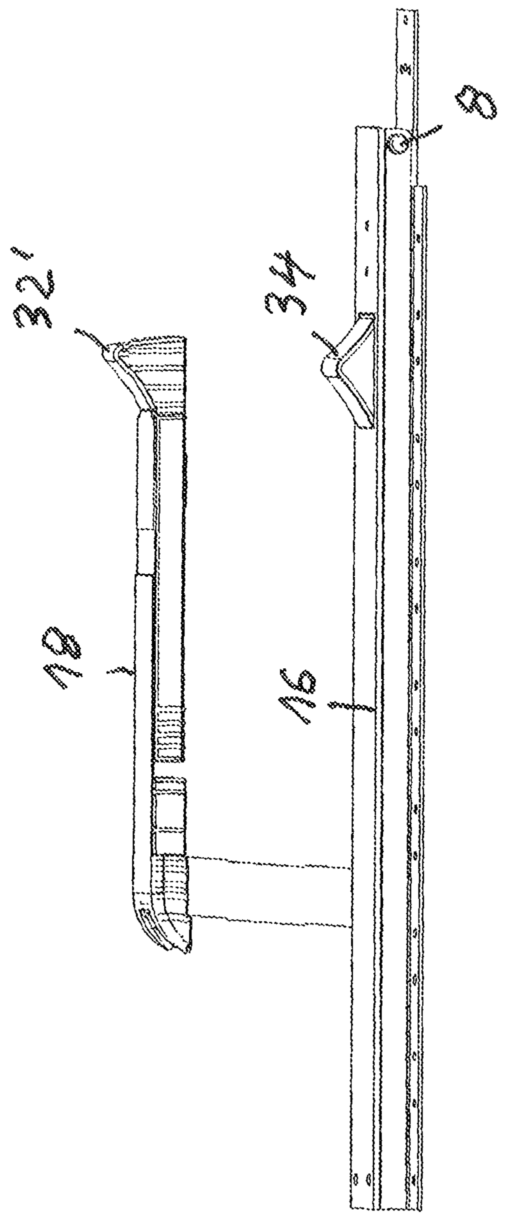
Fig. 1.9

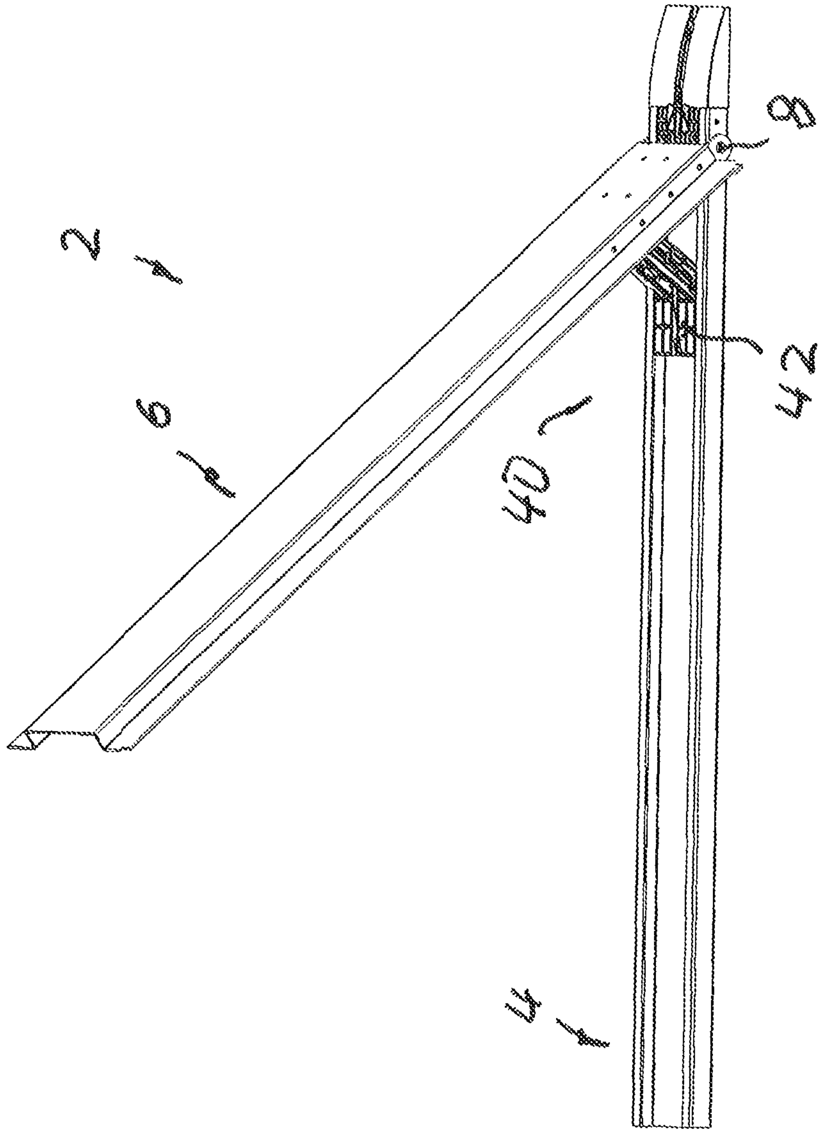
Fig. 4.1

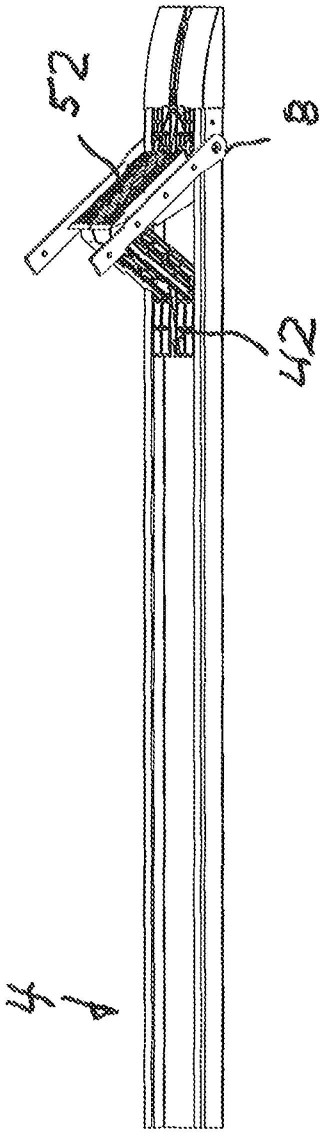
Fig 4.2

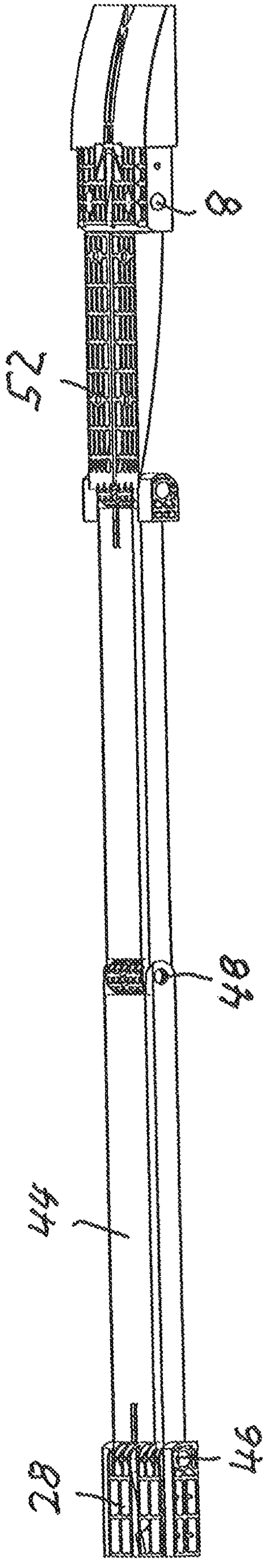
Fig. 5.2

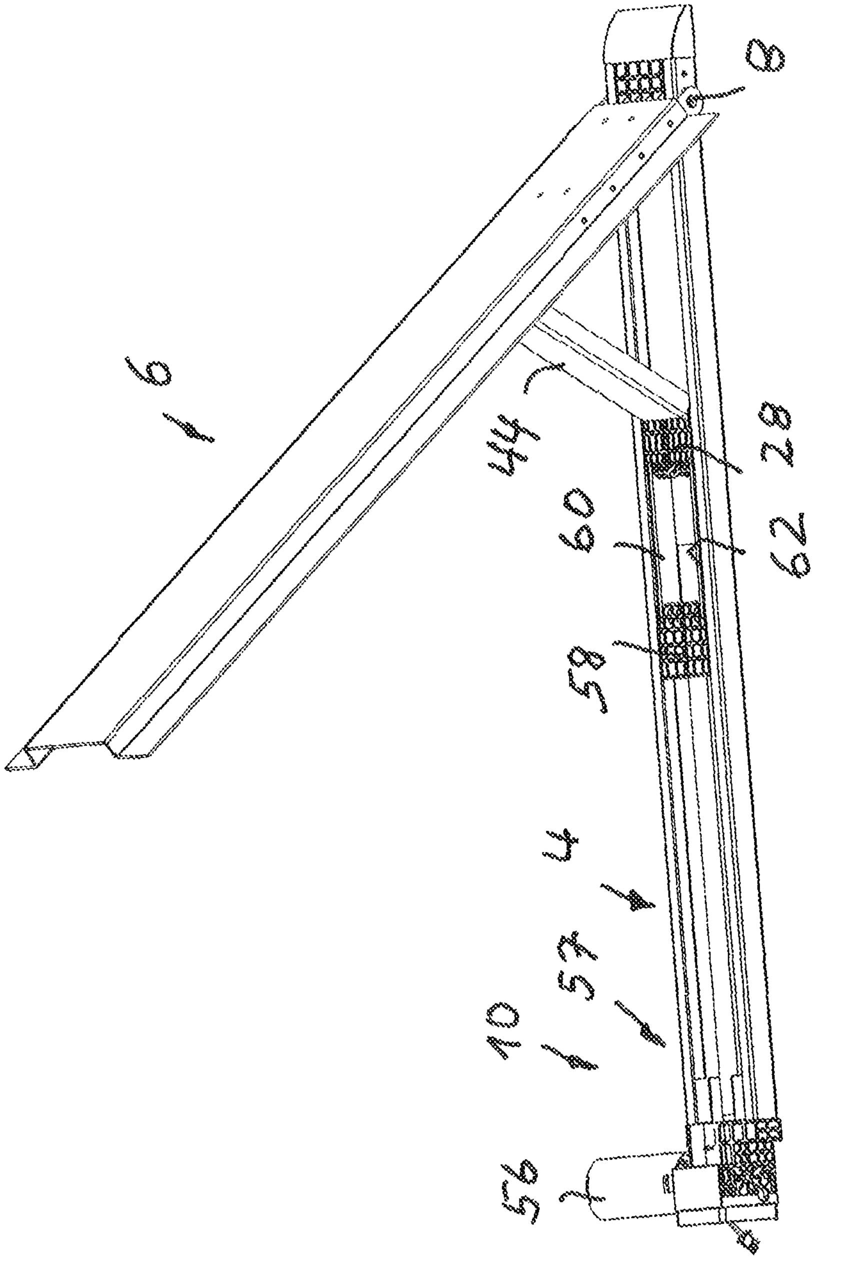
Fig. 6.1

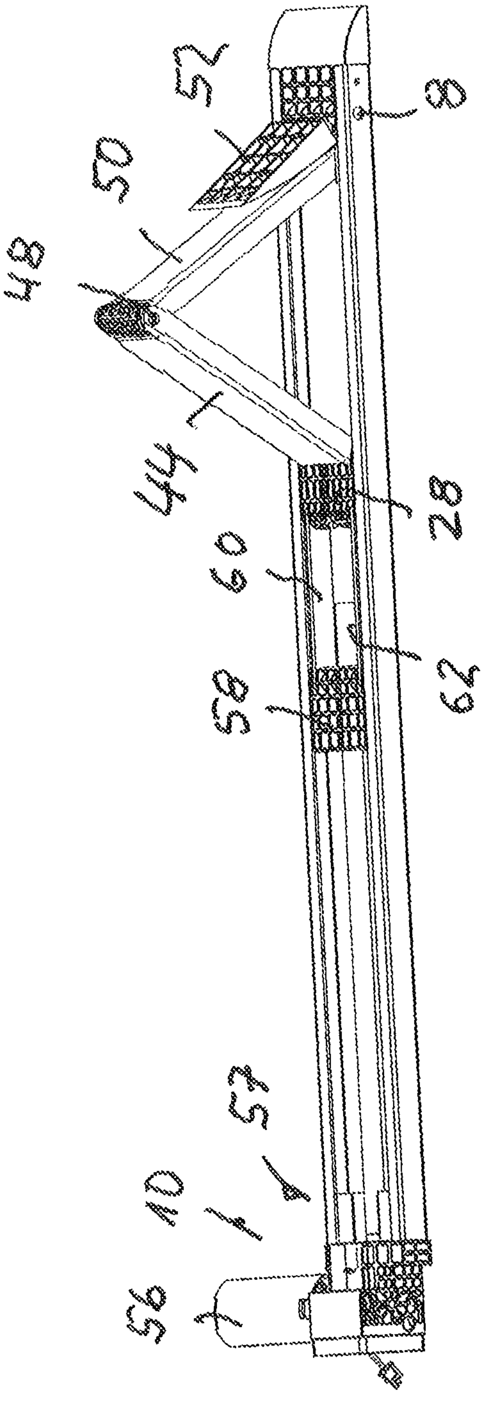
Fig. 6.2

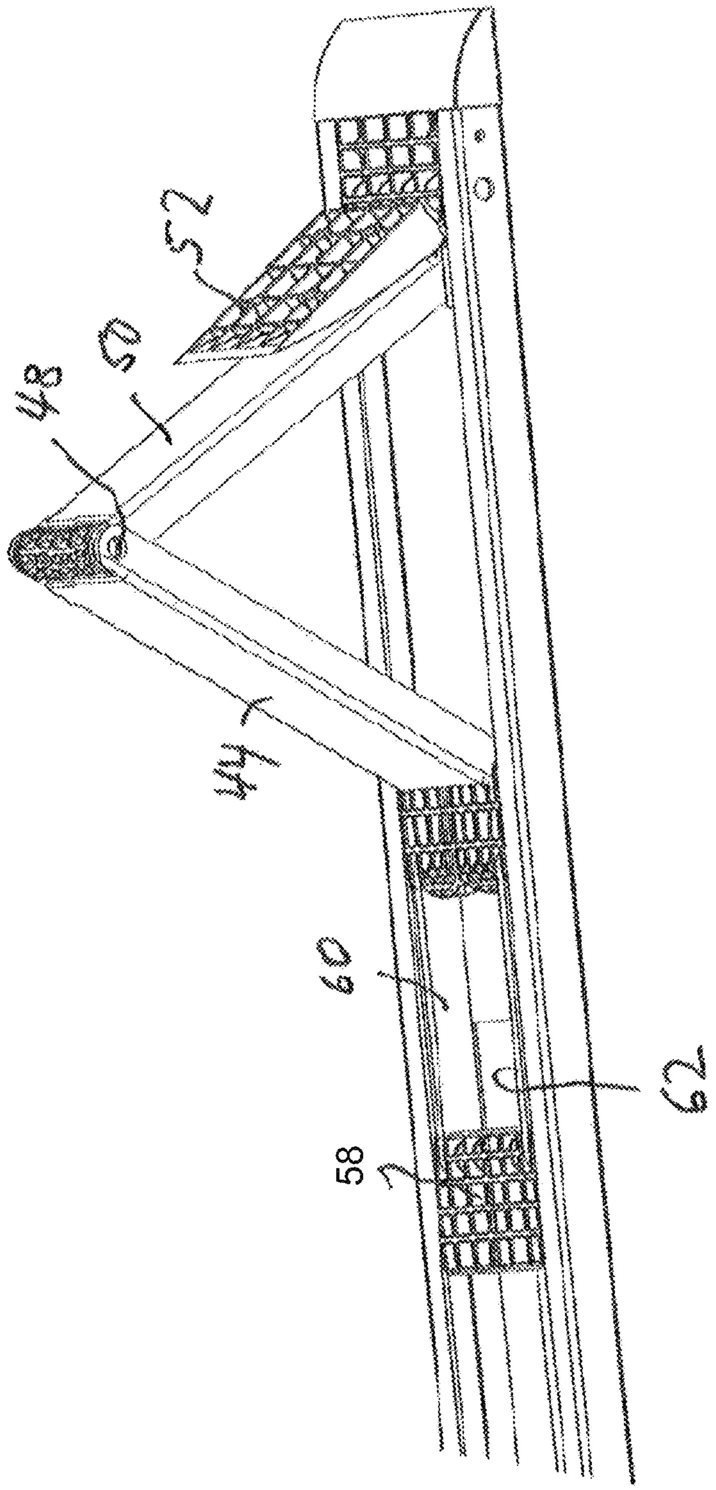
Fig. 6.3

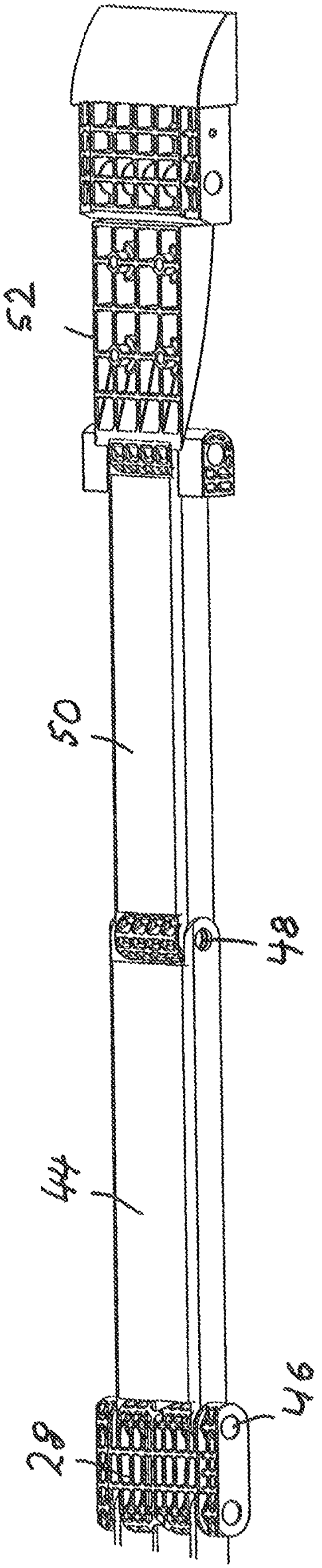
Fig. 6.5

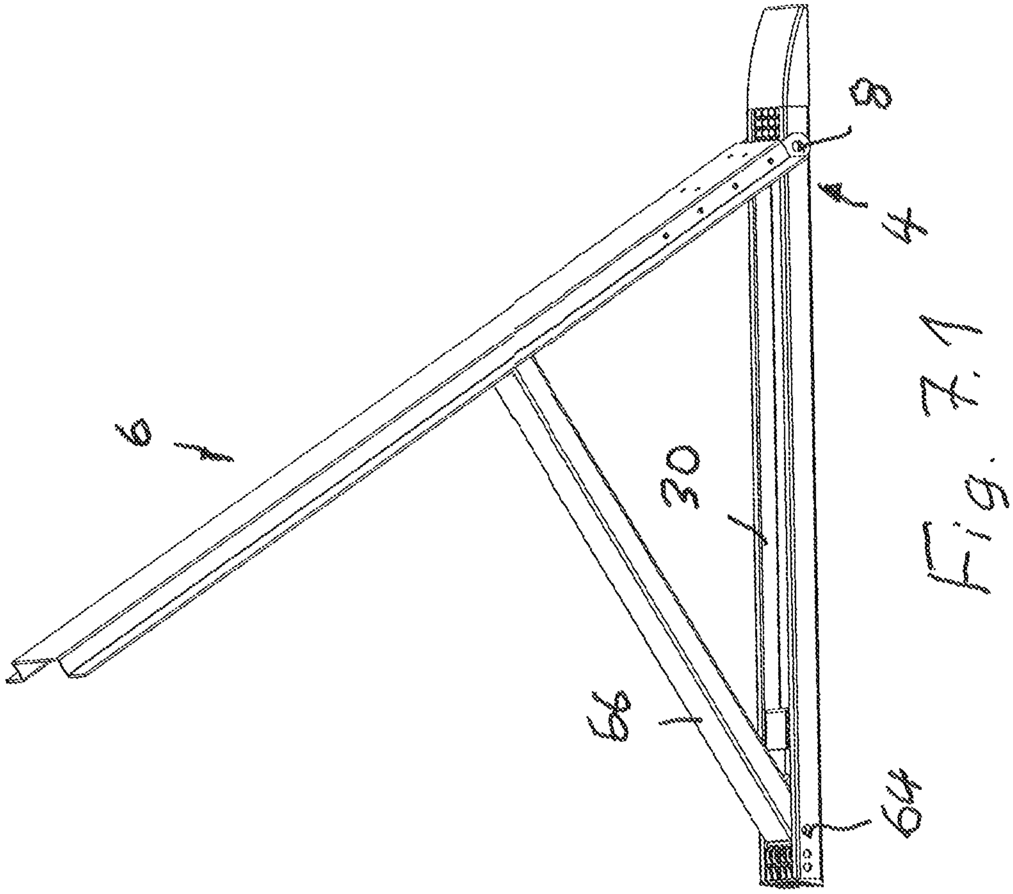
Fig. 7.1

Fig. 7.3

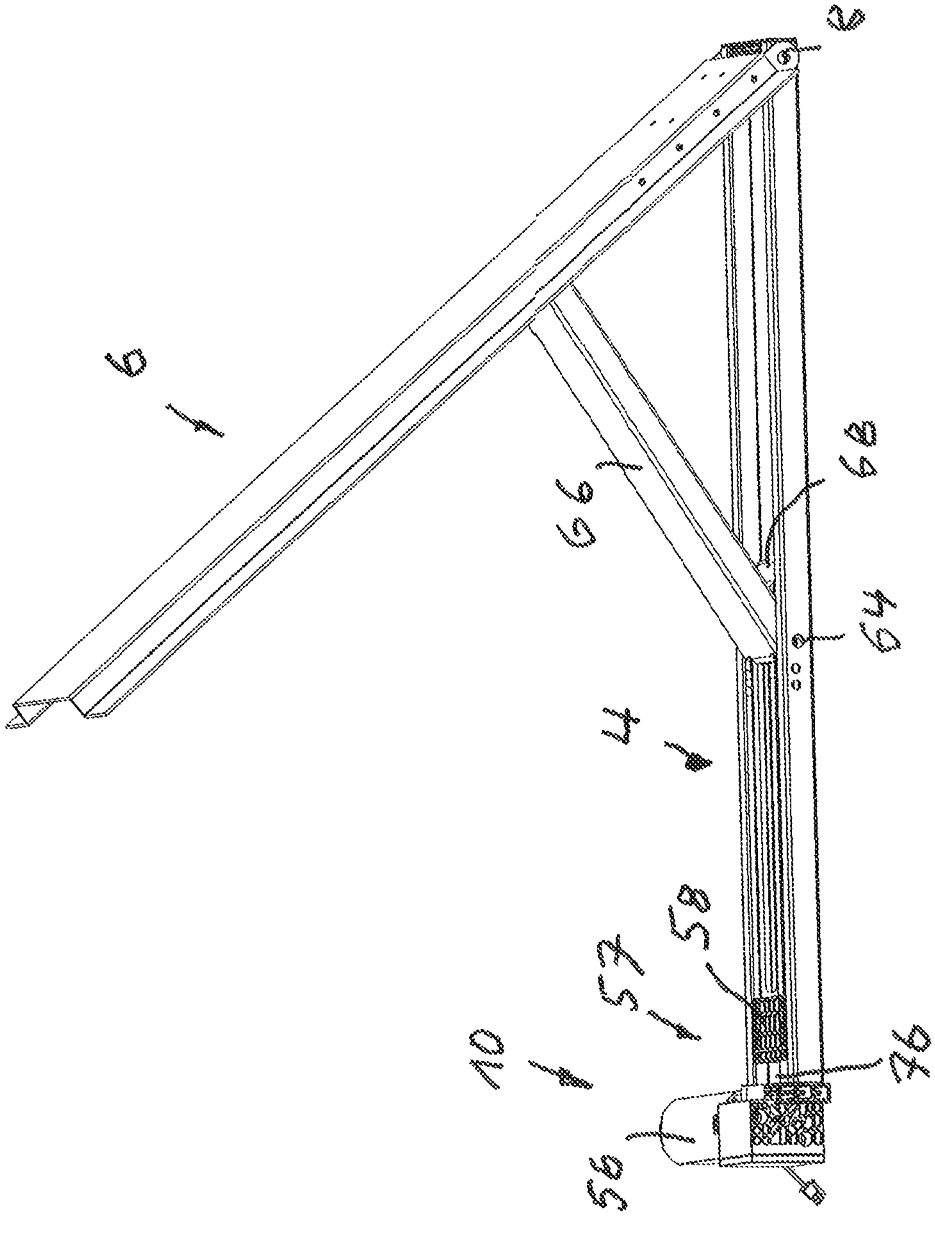
Fig. 8.1

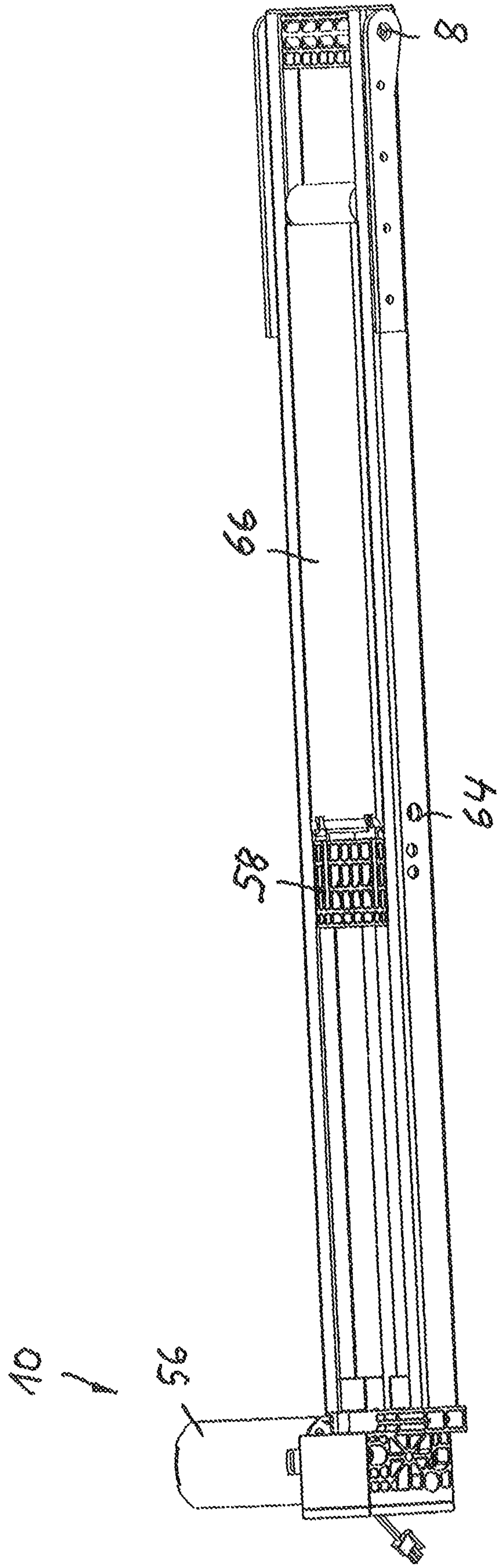
Fig. 8.2

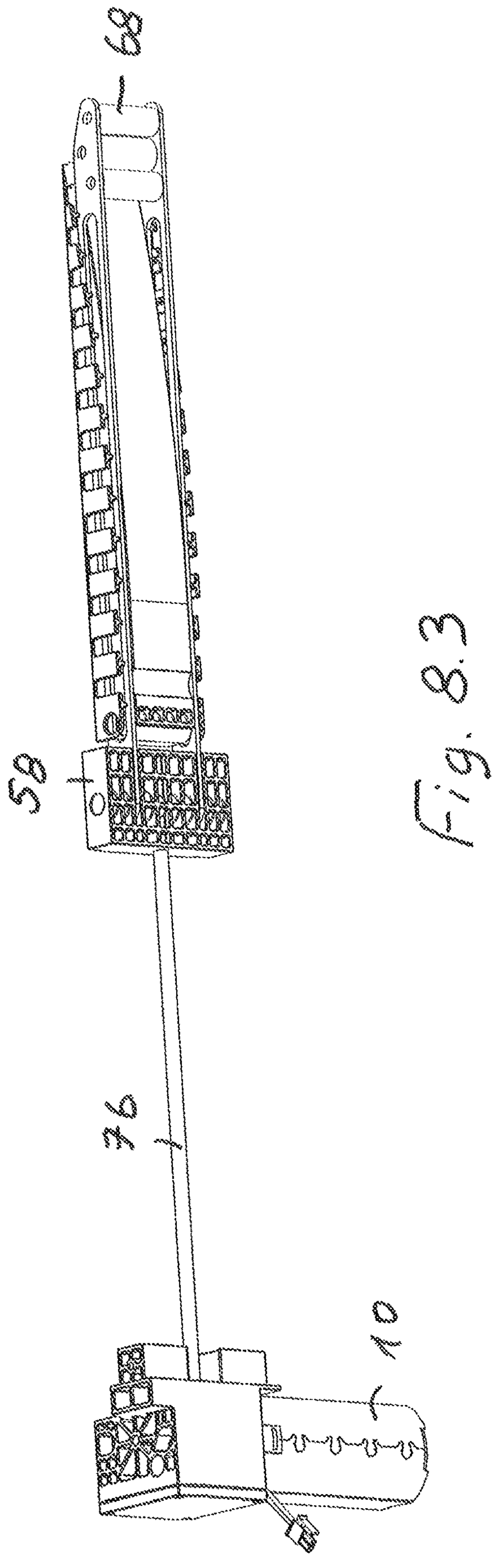
Fig. 8.3

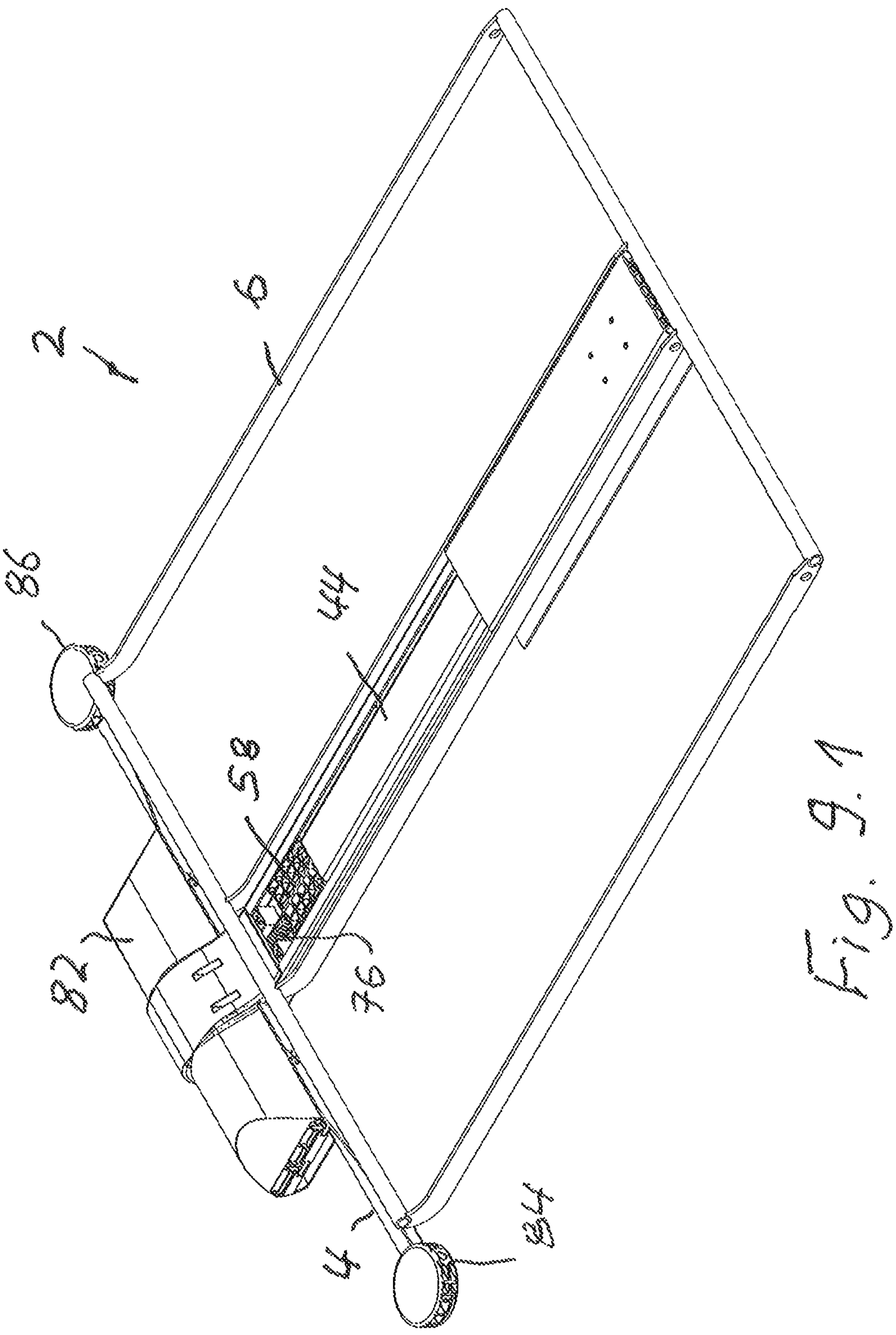
Fig. 9.1

Fig. 9.5

Fig. 9.6

SUPPORT DEVICE ADJUSTABLE BY AN ELECTRIC MOTOR

The invention relates to a support device adjustable by an electric motor of the type for supporting the upholstery of a piece of furniture for sitting and/or lying on, in particular a mattress of a bed.

For the adjustment of slatted frames, for example, so-called double drives are known which have a housing designed as a separate component that can be connected to the slatted frame, in which two adjustment units are accommodated, one of which is used, for example, to adjust a back support part and the other to adjust a leg support part of the slatted frame. In the known double drives, the adjustment units are designed as spindle drives, wherein the drive-related coupling to a support part to be adjusted takes place via a coupling lever which is non-rotatably connected to a pivot shaft assigned to the support part to be adjusted. To adjust the support part, the spindle nut of the spindle drive presses against the coupling lever, so that the pivot shaft and thus the support part pivot. Such double drives are known, for example, from EP 0 372 032 A1 and DE 38 42 078 A1.

EP 3 009 052 A1 discloses a support device adjustable by an electric motor. The support device known from the publication has a base part, a support part which is connected to the base part so as to be pivotable about a support part pivot axis and an electromotive drive unit which is in operative connection with the base part and the support part for the pivoting adjustment of the support part relative to the base part, wherein the base part and the support part are designed in such a way and in operative connection with the drive unit in such a way that the support part can be adjusted between an unadjusted initial position in which the support part rests flat on the base part, and an end position of the adjustment movement in which the support part is arranged at an angle to the base part.

The object of the invention is to specify a support device adjustable by an electric motor, which is further improved compared to the support device of the prior art.

This object is achieved by the invention described herein.

The invention provides that the drive unit has at least one drive train, by means of which the drive unit is in drive connection with an adjustment element that is translationally movable along a linear axis, in such a way that the adjustment element is movable by means of the drive unit between an initial position which corresponds to the unadjusted initial position of the support part, and an end position which corresponds to the end position of the adjustment movement, and that at least one wedge-like acting guide element is arranged on at least one of the parts, which guide element is shaped in such a way and is in or can be brought into operative connection with the adjustment element in such a way that the support part is pivoted about the pivot axis relative to the base part during a relative movement between the adjustment element and the guide element.

The invention provides a support device adjustable by an electric motor, which support device is of simple and robust construction and is suitable for applying high adjustment forces.

Advantageous and expedient further embodiments of the invention are as described herein.

The invention is explained in more detail below on the basis of embodiments with reference to the accompanying schematic drawing. All the features described, shown in the drawing and claimed in the claims, taken individually and in any technically meaningful combination with one another, form the subject matter of the invention, regardless of how they are summarized in the claims and their references and regardless of their specific description or representation in the drawing. The subject matter and disclosed content of the present application also include sub-combinations of the claims in which at least one feature of the respective claim is omitted or replaced by another feature. The subject matter and disclosed content of the application also include combinations of the individual embodiments in which at least one feature of one embodiment is transferred to another embodiment. It is evident to a person skilled in the art that the features disclosed in the individual embodiments develop the respective embodiment per se, i.e. independently of the other features of the embodiment.

Figure 3:
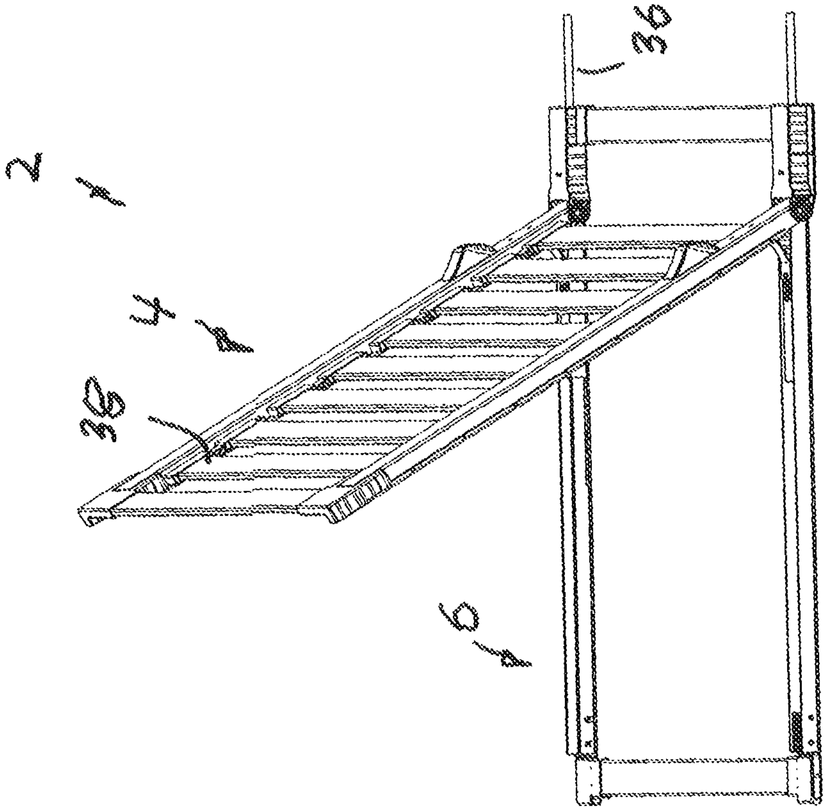
Figure 43:
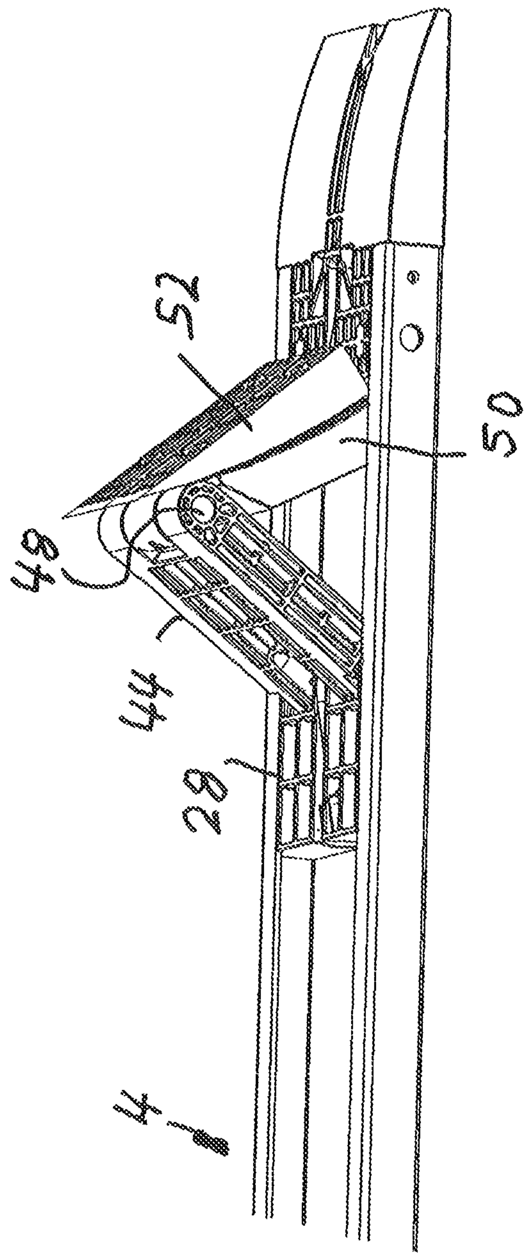
Figure 44:
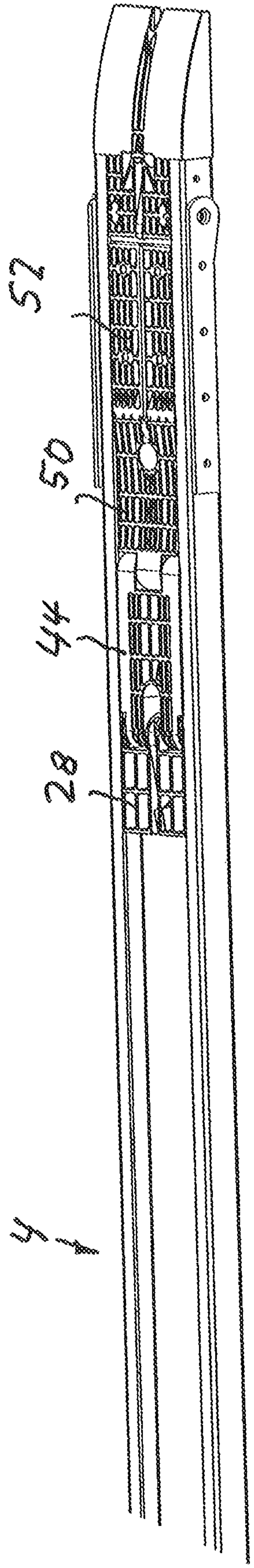
Figure 45:
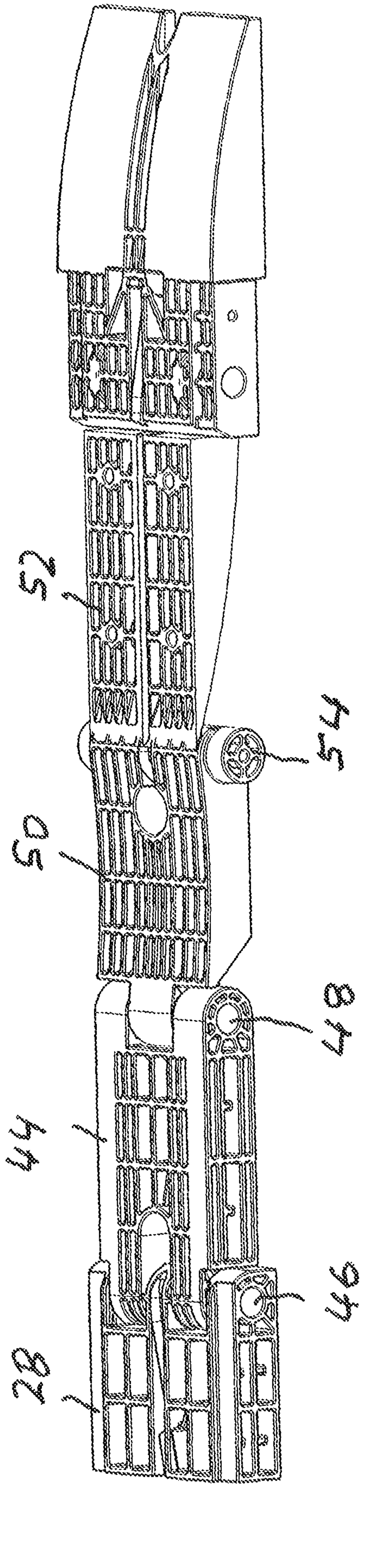
Figure 51:
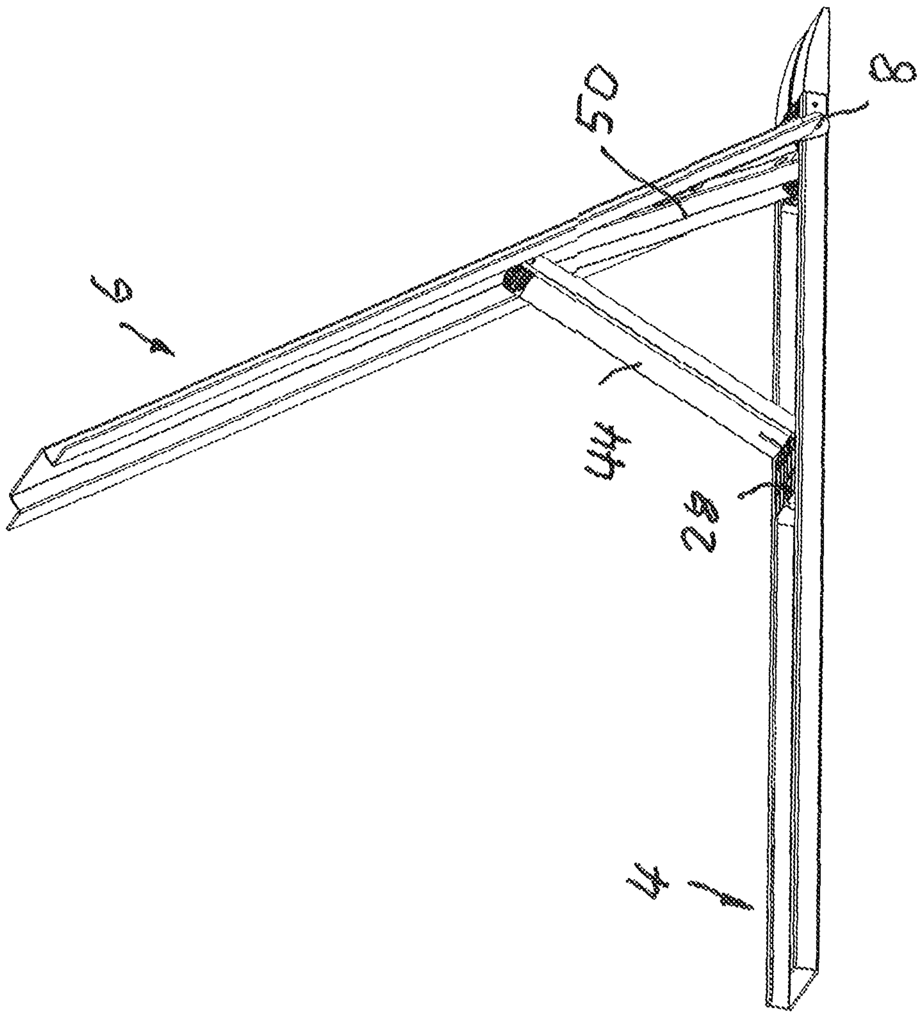
Figure 64:
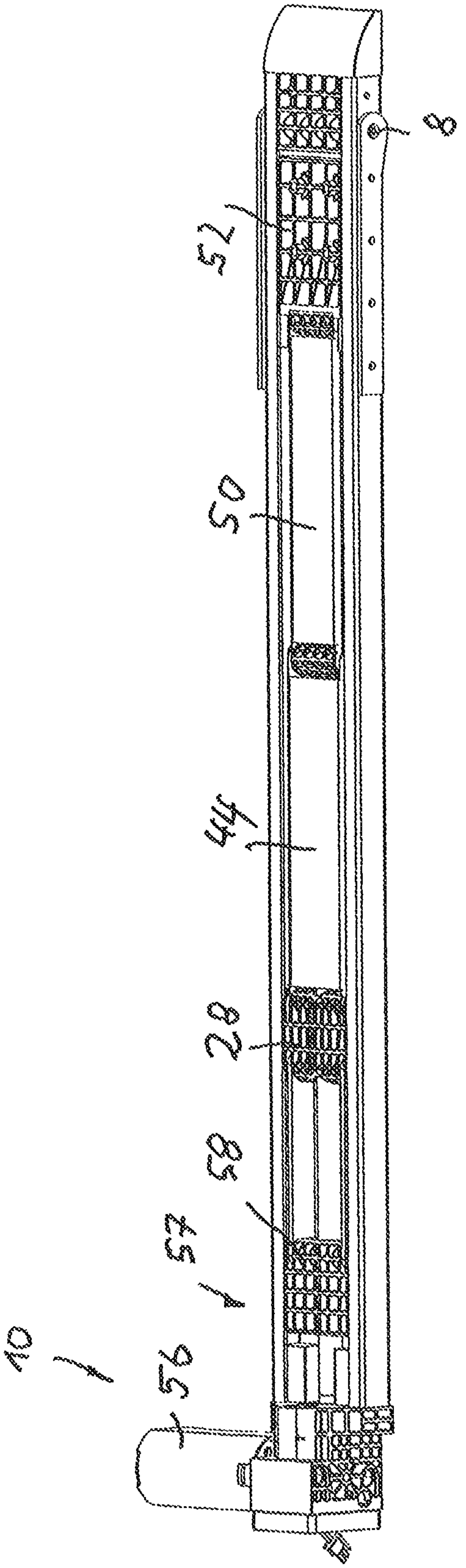
Figure 72:
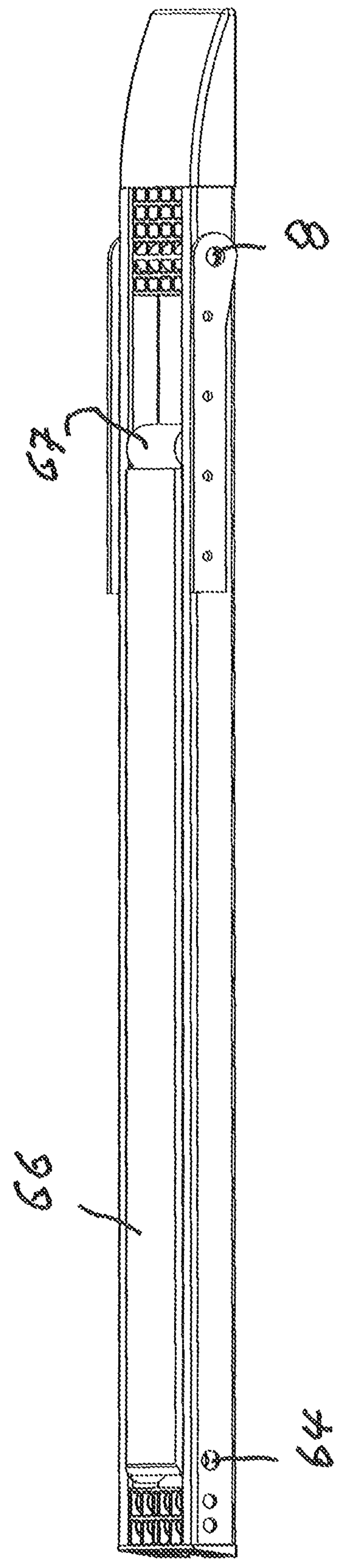
Figure 73:
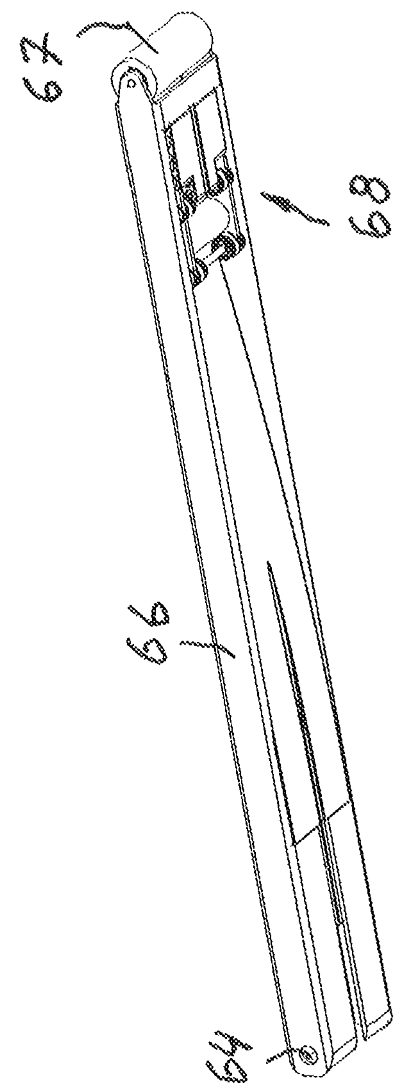
Figure 74:
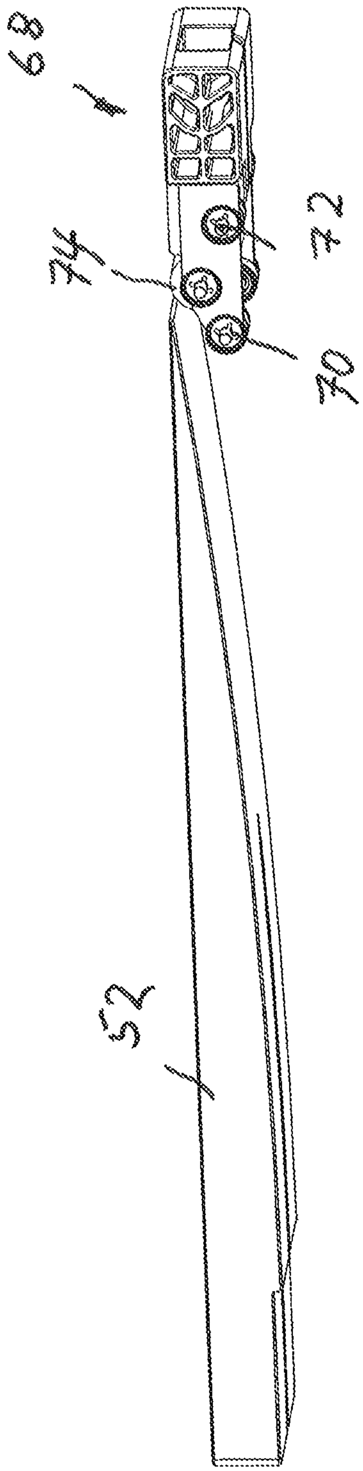
Figure 84:
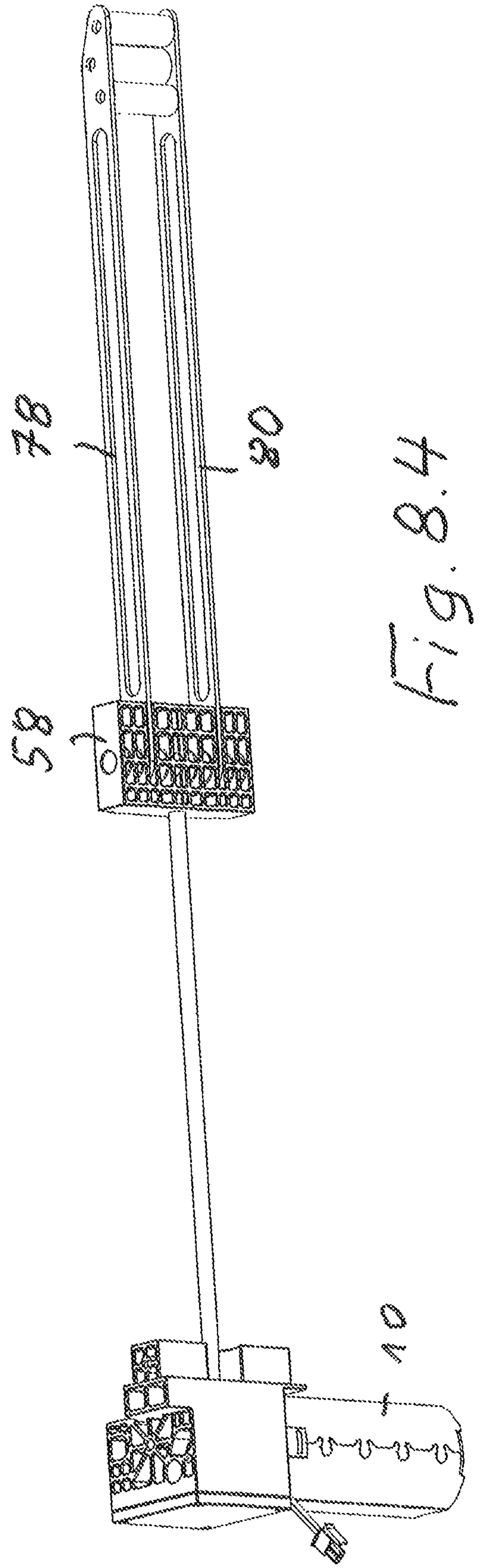
Figure 85:
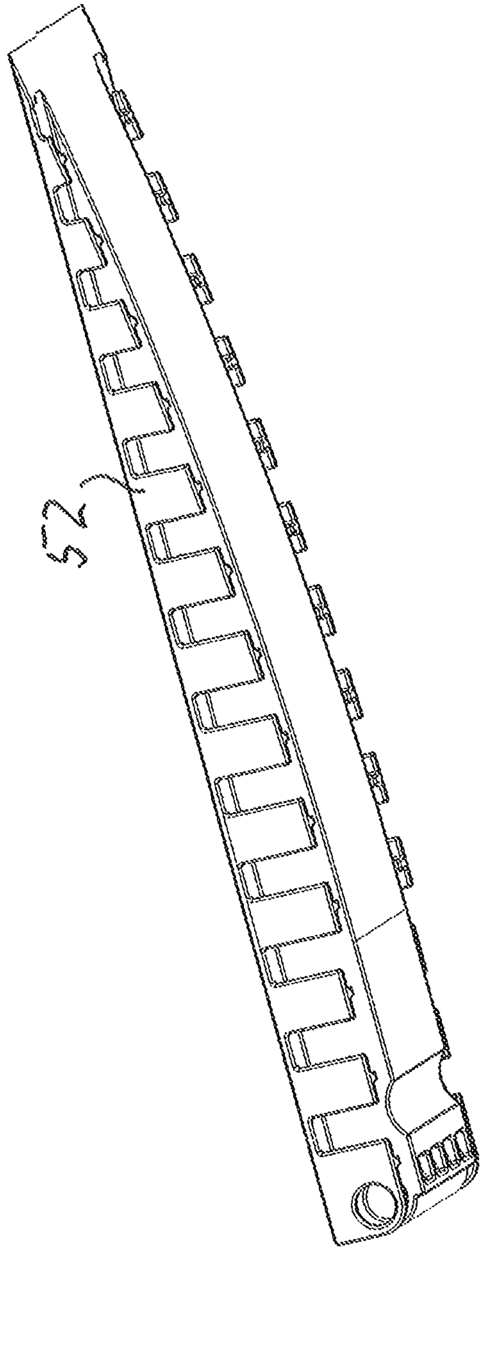
Figure 92:
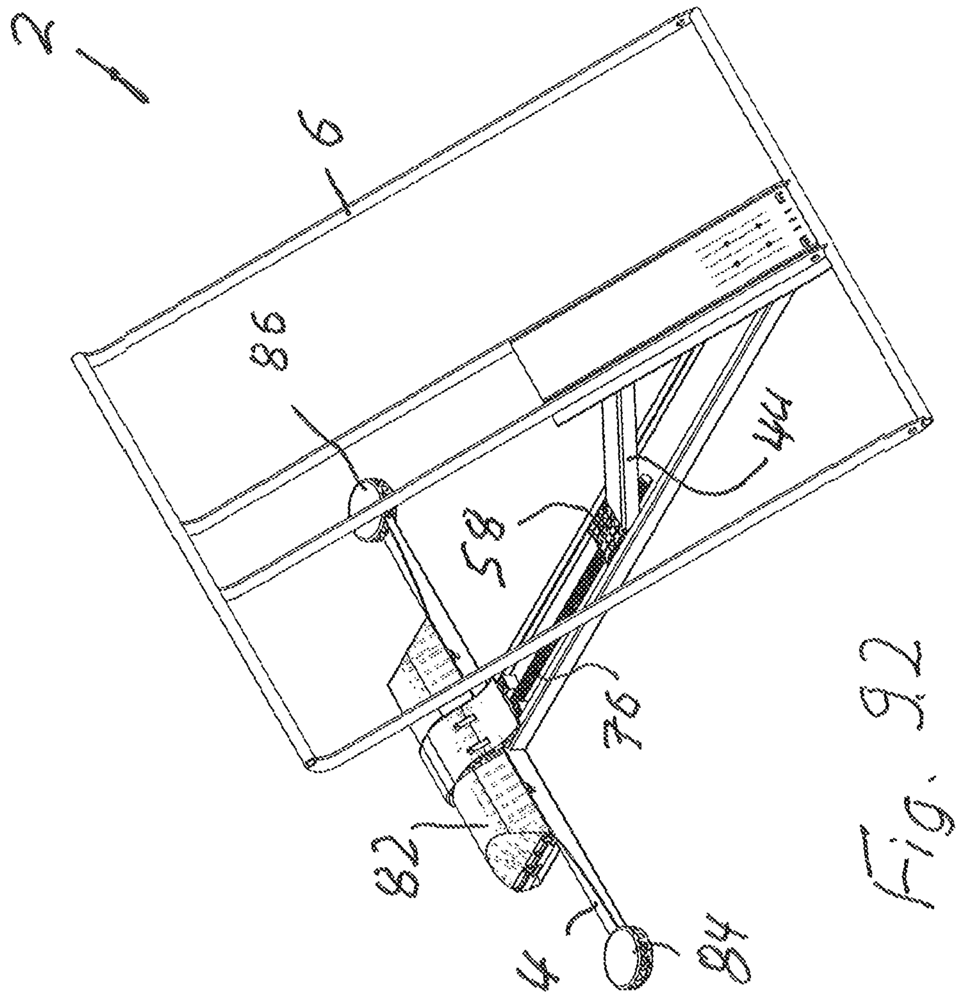
Figure 93:
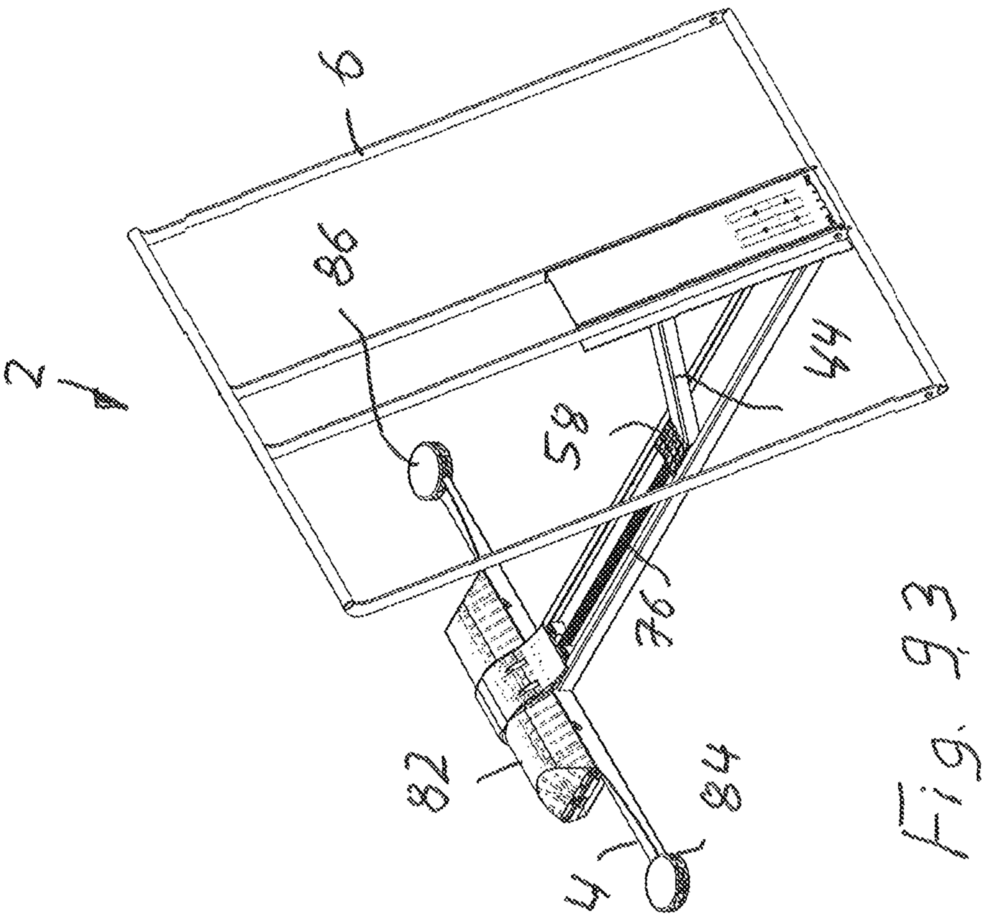
Figure 94:
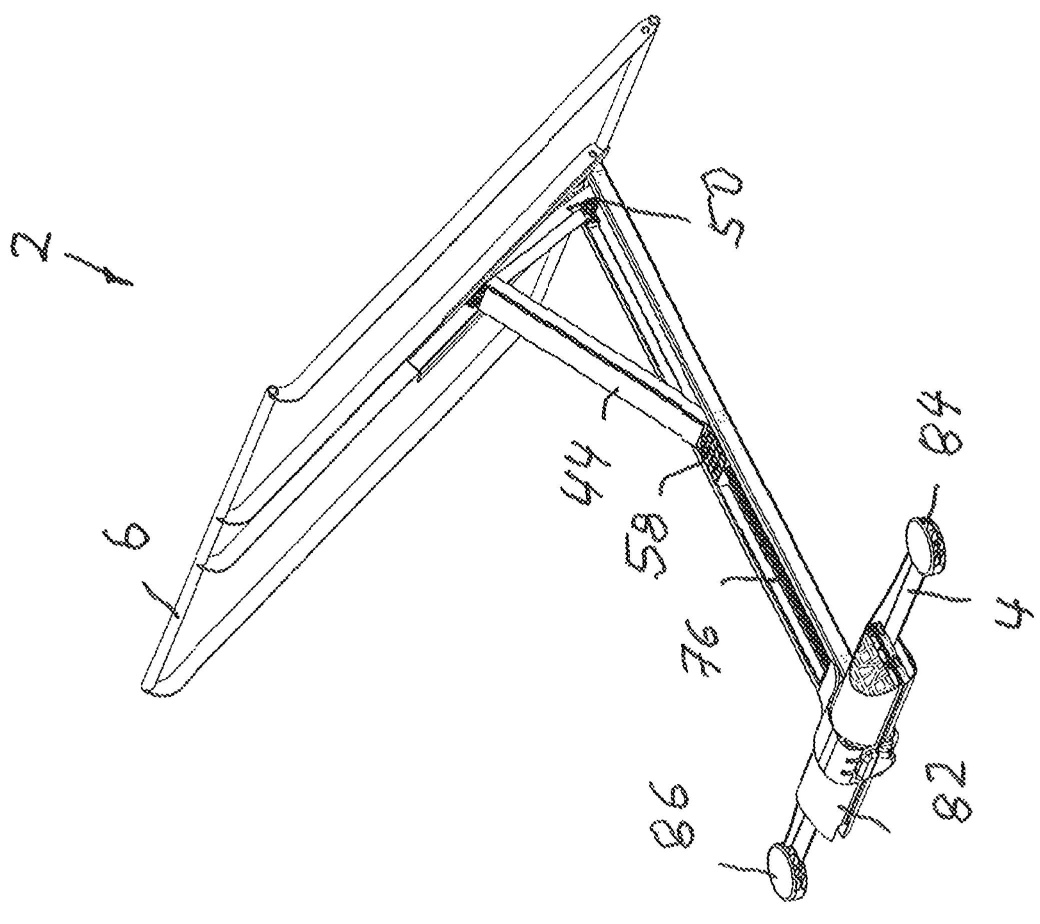
Figure 95:
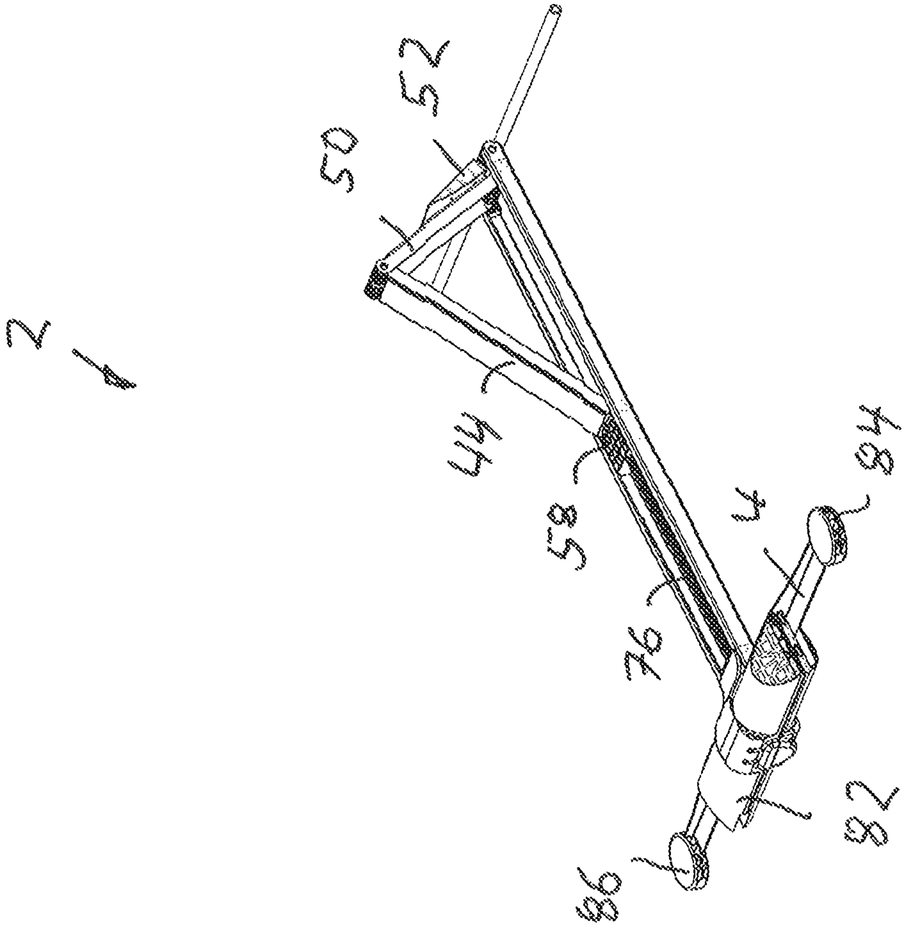
Figure 96:
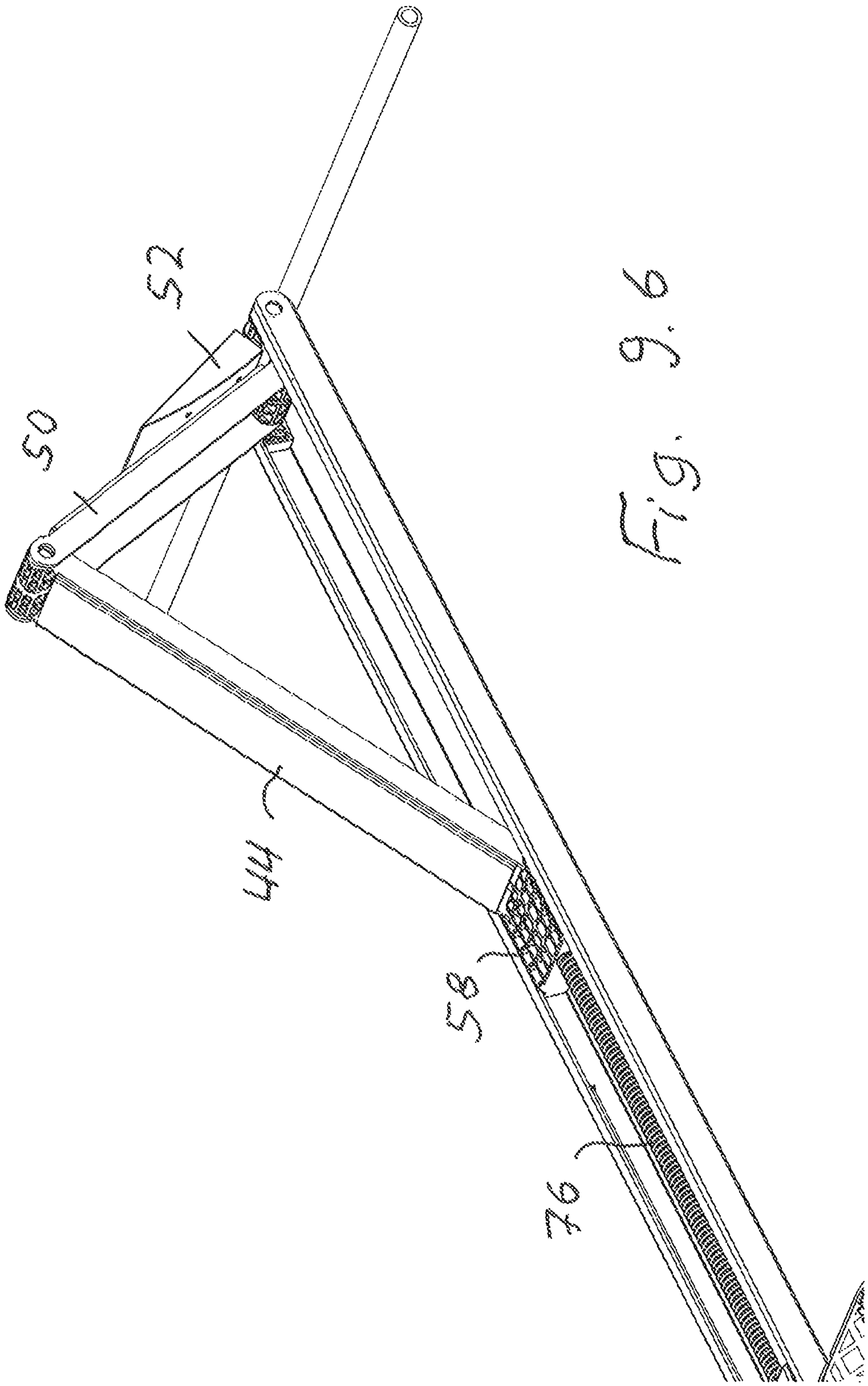
Figure 97:
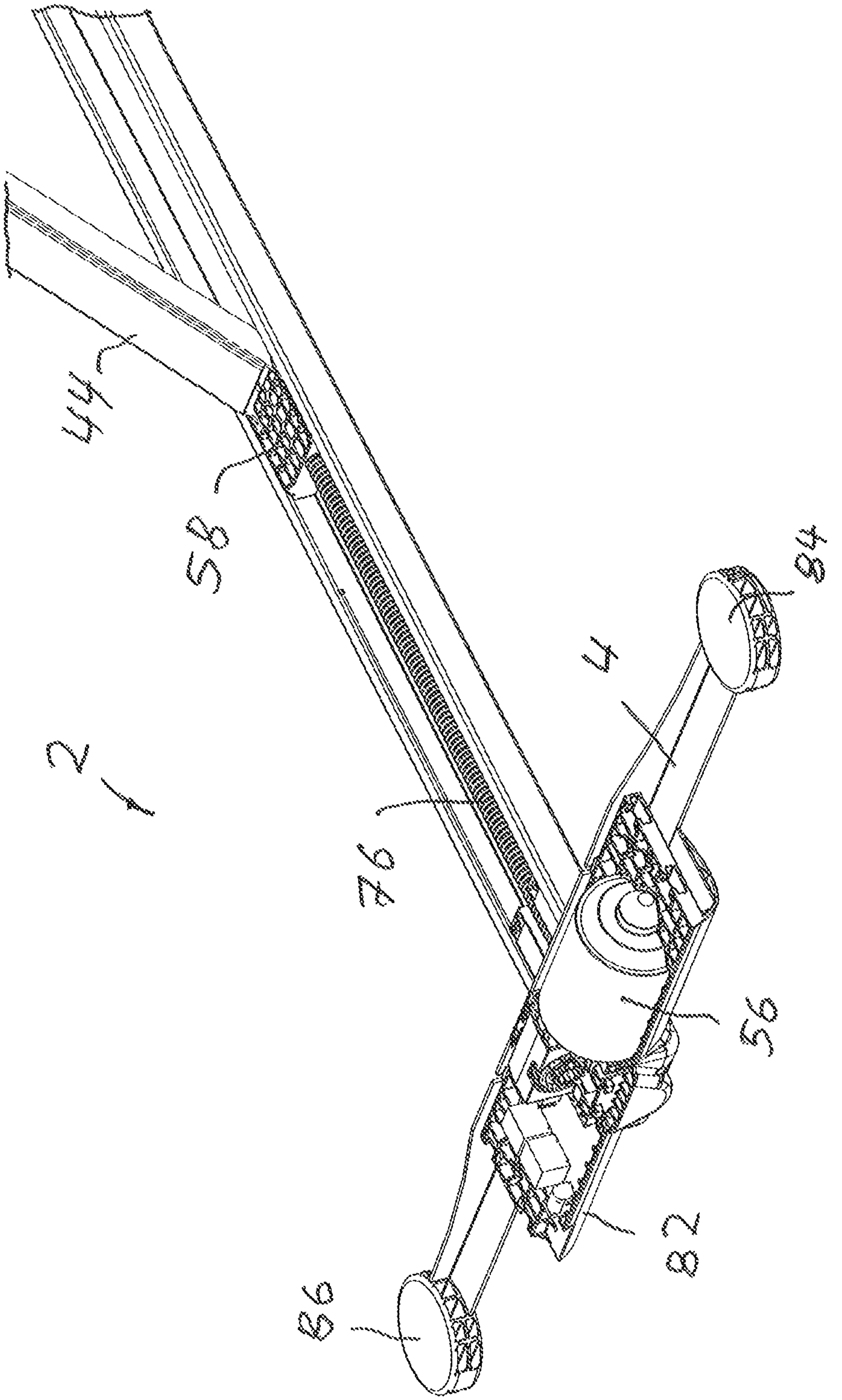
Figure 98:
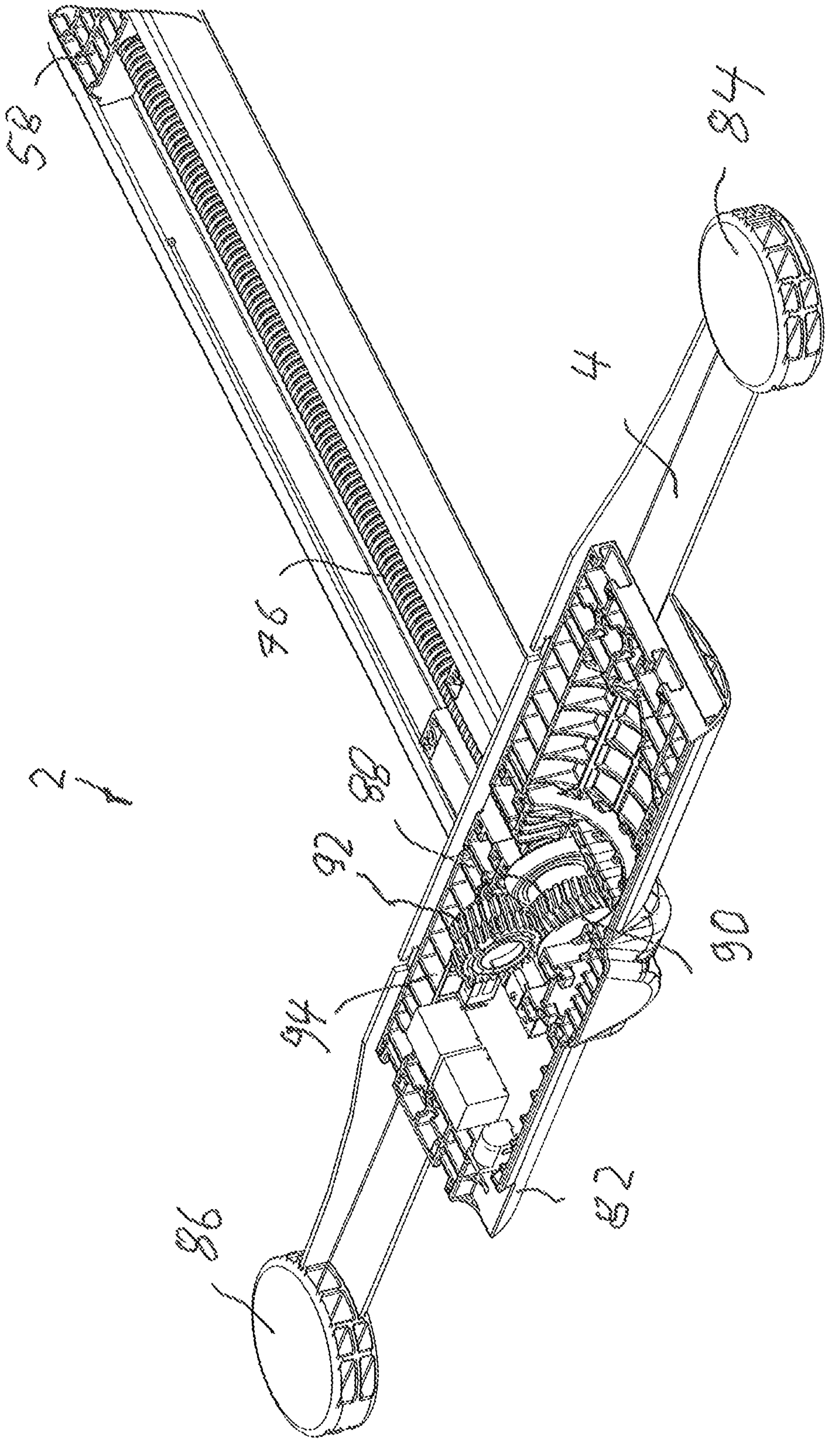

In the drawing:

FIGS. 1.1 to 1.9 show, in various perspective views, a first embodiment of a support device according to the invention, FIG. 2 shows, in a perspective view, a second embodiment of a support device according to the invention, FIG. 3 shows, in a perspective view, a third embodiment of a support device according to the invention, FIGS. 4.1 to 4.5 show, in various perspective views, a fourth embodiment of a support device according to the invention, FIGS. 5.1 and 5.2 show, in two perspective views, a fifth embodiment of a support device according to the invention, FIGS. 6.1 to 6.5 show, in various perspective views, a sixth embodiment of a support device according to the invention, FIGS. 7.1 to 7.4 show, in various perspective views, a seventh embodiment of a support device according to the invention, FIGS. 8.1 to 8.5 show, in various perspective views, an eighth embodiment of a support device according to the invention and FIGS. 9.1 to 9.8 show, in various perspective and schematic views, a sixth embodiment of a support device according to the invention.

In the figures of the drawing, the same or corresponding components are provided with the same reference numerals.

For illustrative purposes and to simplify the explanation, individual components have been omitted from individual figures. The omitted components are to be supplemented accordingly in the relevant figures.

A first embodiment of a support device according to the invention is explained in more detail below with reference to FIGS. 1.1 to 1.9.

In FIG. 1.1 to FIG. 1.9, a first embodiment of a support device 2 according to the invention adjustable by an electric motor for supporting the upholstery of a piece of furniture for sitting and/or lying on, in particular a mattress of a bed, is shown. To simplify the illustration, the upholstery is not shown in the drawing. The manner in which corresponding upholstery is supported by means of a support device is generally known to a person skilled in the art and is therefore not explained in more detail here.

FIG. 1.1 shows the support device 2 in an unadjusted initial position of the adjustment movement, while FIG. 1.2 shows the support device 2 in an end position of the adjustment movement.

The support device 2 has a base part 4 and a support part 6 which is connected to the base part 4 so as to be pivotable about a support part pivot axis 8 (see FIG. 1.4). The support device 2 is particularly suitable for retrofitting a support device which cannot be adjusted by an electric motor ex works, for example a slatted frame of a bed, with the functionality of an electric motor adjustment. The support device 2 according to the invention is also particularly suitable for temporary fitting or permanent retrofitting of a hospital or hotel bed in order to give it the functionality of an electric motor adjustment. The basic structure and the possible uses of a corresponding support device are known from EP 3 009 052 A2, to which reference is made at this point and the content of which is hereby fully incorporated into the present application by reference.

The support device 2 also has an electromotive drive unit 10, which is in operative connection with the base part 4 and the support part 6 for the pivoting adjustment of the support part 6 relative to the base part 4. The base part 4 and the support part 6 are designed in such a way and in operative connection with the drive unit 10 in such a way that the support part 6 can be adjusted between an unadjusted initial position (see FIG. 1.1) in which the support part 6 rests flat on the base part 4, and an end position of the adjustment movement in which the support part is arranged at an angle to the base part 4 (see FIG. 1.2).

The support part 6 carries spring elements on its upper side, on which upholstery, for example a mattress of a bed, is supported when the support device 2 is used. In the embodiment shown, the spring elements are formed by spring elements made of plastics, of which only one spring element is provided with the reference numeral 12 as an example in FIGS. 1.1 and 1.2.

For a more detailed explanation of the structure of the base part 4 and the support part 6, the spring elements 12 are omitted in FIG. 1.3, which corresponds to FIG. 1.1 and shows the support device 2 in the unadjusted initial position, and FIG. 1.4, which corresponds to FIG. 1.2 and shows the support device 2 in the end position of the adjustment movement.

The base part and the support part in the initial unadjusted position being adjacent to each other and maintaining the support device flat, as shown and described.

It can be seen in particular from FIG. 1.4 that the support part 6 has longitudinal spars 14, 16, while the base part 4 has longitudinal spars 18, 20 which are connected to one another via a transverse spar 22.

According to the invention, the drive unit 10 has at least one drive train, by means of which the drive unit 10 is in drive connection with an adjustment element that is translationally movable along a linear axis, in such a way that the adjustment element is movable by means of the drive unit between an initial position which corresponds to the unadjusted initial position of the support part, and an end position which corresponds to the end position of the adjustment movement. In the illustrated embodiment, there are two drive trains, namely a drive train 24 assigned to the longitudinal spars 14, 18 and a drive train 26 assigned to the longitudinal spars 16, 20. Only the drive train 26 is explained in more detail below. The drive train 24 is constructed accordingly.

The drive train 26 has an output member 28 that is translationally movable along a linear axis and which in this embodiment is formed by a slide that is guided in a linear guide 30 defined by the longitudinal spar 20 and formed by a U-profile. In the U-profile, the slide is translationally movable in the longitudinal direction of the longitudinal spar 20 along a linear axis which runs in the longitudinal direction of the longitudinal spar 20.

In this embodiment, the electromotive drive unit 10 is formed by a furniture drive using a Bowden cable with a pull cable and a sheath. A corresponding furniture drive is known from EP 2 792 277 B2, the content of which is hereby fully incorporated into the present application by reference. To simplify the illustration, the Bowden cable is not shown in FIGS. 1.1 to 1.9.

The output member 28 is connected to a movable part of the Bowden cable so that said output member is moved translationally along the linear axis when the furniture drive is actuated.

The moving part of the Bowden cable can be the pull cable of the Bowden cable, while the sheath is arranged in a stationary manner. In a kinematic reversal of this, however, the movable part of the Bowden cable can also be the sheath, while the pull cable is arranged in a stationary manner, as is known from EP 3 157 389 A1.

To adjust the support part 6 relative to the base part 4, an adjustment element 32 is provided which, in this embodiment, is molded onto the output member 28. According to the structural design of the support device 2, the adjustment element 32 can, however, also be designed as a separate component connected to the drive element in a non-displaceable manner, or it can be in operative connection with the output member 28 in another suitable manner.

According to the invention, at least one wedge-like guide element 34 is arranged on one of the parts (base part 4, support part 6), which guide element is shaped in such a way and is in or can be brought into operative connection with the adjustment element 32 in such a way that the support part 6 is pivoted about the support part pivot axis 8 relative to the base part 4 during a relative movement between the adjustment element 32 and the guide element 34.

In the illustrated embodiment, the wedge-like guide element 34 is arranged on the support part in the region of the support part pivot axis 8 (see in particular FIG. 1.5).

According to the arrangement on the output member 28 guided in the linear guide 30, the adjustment element 32 is arranged on the base part 4 in the illustrated embodiment.

In the embodiment shown, the adjustment element 32 is nose-like and protrudes over the base part 4 in the direction of the support part 6, as can be seen in particular from FIG. 1.9 in relation to the adjustment element 32' of the drive train 24.

In the initial position of the adjustment movement, the adjustment element 32 is received in a recess formed on the support part 6, the inner wall of which forms a contact surface for the adjustment element 32, the cross section of which tapers in the direction of the support part pivot axis 8, so that the support part 6 can be or is pivoted about the support part pivot axis 8 during a translational movement of the adjustment element 32 in the direction of the support part pivot axis 8.

In the illustrated embodiment, the guide element 34 is formed by a molded part connected to the longitudinal spar 20 of the support part 6, the side of which facing the base part 4 forms the recess and contact surface for the adjustment element 32, as can be seen in particular from FIG. 1.8.

In order to adjust the support part 6 relative to the base part 4, the adjustment element is moved translationally relative to the guide element 34, wherein the guide element 34 is designed or shaped in such a way and is in operative connection with the adjustment element 32 in such a way that the support part 6 is pivoted about the support part pivot axis 8 relative to the base part 4 during a relative translational movement between the adjustment element 32 and the guide element 34.

In the unadjusted initial position of the adjustment movement shown in FIGS. 1.1 and 1.3, the support part 6 rests flat on the base part 4, wherein the nose-like adjustment element 32 protrudes into the recess defined by the guide element 34 over the upper side of the support part 6.

Starting from this initial position, the furniture drive (electromotive drive unit 10) is actuated in such a way that the adjustment element 32 is moved translationally to the right in the drawing along the linear guide 30. During this relative movement, the adjustment element 32 rests on the underside of the guide element 34 so that, as a result of the shape of the guide element 34, the support part 6 is pivoted about the support part pivot axis 8 relative to the base part 4 until the end position of the adjustment movement shown in FIGS. 1.2 and 1.4 is reached, in which the support part 6 is arranged at an angle relative to the base part 4 and is maximally adjusted.

FIG. 1.5 shows the support device 2 in the same representation as FIG. 1.4 and illustrates the interaction of the adjustment element 32 with the guide element 34.

FIG. 1.6 shows, on a larger scale than FIG. 1.5, a detailed view from FIG. 1.5 in the region of the adjustment element 32 and the guide element 34.

In FIG. 1.7, omitting the other components of the support part 6, the guide element 34 is shown in interaction with the adjustment element 32.

In FIG. 1.8, the longitudinal spar 20 is also omitted.

The re-adjustment of the support part 6 back to the initial position relative to the base part 4 takes place with the drive unit switched on, but under the weight of the upholstery resting on the support part 6 and possibly under the additional weight of a person resting on the upholstery.

The support device 2 according to the invention is simple and robust in structure and suitable for applying high adjustment forces, which are required, for example, when the support part 6 is adjusted under the load of a person resting on the upholstery supported by the support device 2.

The actuation of the Bowden cables assigned to the drive trains 24, 26 can in principle be carried out by separate furniture drives which are synchronized by a control device. To simplify the structure, however, actuation is preferably carried out by a common furniture drive which actuates both Bowden cables synchronously, as is known, for example, from EP 2 792 277 B1. In this way, use of the support part 6 during the adjustment is reliably avoided.

In the illustrated embodiment, two drive trains assigned to the longitudinal spars 14, 18 and 16, 20, respectively, are used. While maintaining the basic principle according to the invention, a single drive train can also be used, which drive train is arranged in the longitudinal center plane of the support part 6 or base part 4.

According to the invention, "wedge-like action" is understood to mean that the component in question performs the function of a wedge or an inclined plane, regardless of its shape and design.

In FIG. 2, a second embodiment of a support device 2 according to the invention is shown. While in the embodiment according to FIGS. 1.1 to 1.9 the sheath of the Bowden cable forms the movable part which is moved by means of the furniture drive, in the embodiment according to FIG. 2, the pull cable of the Bowden cable is the movable part. As can be seen from FIG. 2, the Bowden cable provided with the reference numeral 36 in FIG. 2 is guided in the region of the support part pivot axis 8 out of the support device 2 to the furniture drive (not shown), which forms the electromotive drive unit 10.

FIG. 3 shows a third embodiment of a support device 2 according to the invention, which embodiment differs from the embodiment according to FIG. 2 in that the spring elements are formed by wooden slats, one of which is provided with the reference numeral 38 in FIG. 3 by way of example.

In FIGS. 4.1 to 4.5, a fourth embodiment of a support device according to the invention is shown, which embodiment differs from the previous embodiments initially in that instead of two drive trains spaced apart from one another transversely to the longitudinal direction of the support device 2, a single drive train 26 is provided which is effective between a single longitudinal spar 20 of the base part 4 and a single longitudinal spar 16 of the support part 6.

Furthermore, the embodiment according to FIGS. 4.1 to 4.5 differs from the preceding embodiments in that a lever arrangement 40 is arranged in the drive train between the base part 4 and the support part 6.

In the embodiment shown, the lever arrangement 40 has a stand-up lever arrangement 42 which functions as an adjustment element for the purposes of the invention and has at least one stand-up lever.

FIGS. 4.1 to 4.3 show the support device 2 in the end position of the adjustment movement, wherein various components are omitted in FIGS. 4.2 and 4.3 for illustrative purposes.

FIG. 4.4 and FIG. 4.5 show the support device in the unadjusted initial position of the adjustment movement, wherein various components are also omitted in FIG. 4.4 and FIG. 4.5 for illustrative purposes.

In detail, the stand-up lever arrangement 42 (see in particular FIG. 4.5) has a first stand-up lever 44, one end of which is articulated and connected to the output member 28 about a first articulation axis 46 and the other end of which is articulated and connected to a second stand-up lever 50 about a second articulation axis 48, the free end of which is in operative connection with a wedge-like guide element 52.

The operative connection between the second stand-up lever 50 and the stroke quide element 52 is designed in such a way that, starting from the unadjusted initial position of the adjustment movement (see FIG. 4.4), in a first kinematic phase, the stand-up levers 44, 50 execute a translational movement when they are in a dead center in their flat position, wherein the stand-up levers 44, 50 are guided in the linear guide 30 and the free end of the second stand-up lever 50 interacts with the stroke quide element 52 to pivot the support part 6 relative to the base part 4, and that in a second kinematic phase, the free end of the second stand-up lever 50 runs against a stop so that the stand-up levers 44, 50 pivotably move into the stand-up position about the second pivot axis 48 relative to one another, whereby the support part 6 continues to pivot about the support part pivot axis 8 relative to the base part 4 until the end position of the adjustment movement is reached.

It can be seen in particular from FIG. 4.5 that the guide element 52 has a cross section which widens at least in portions along the linear axis of the adjustment element.

The guide element 52 is shaped in such a way that its cross section widens along the linear axis in such a way that the adjustment element is in contact with a portion of the guide element 52 having a smaller or minimum cross section in the region of the initial position of the adjustment movement and is in contact with a portion of the guide element 52 having a larger or maximum cross section in the region of the end position of the adjustment movement. As can be seen in particular from FIG. 4.5, the guide element 52 is wedge-shaped in the illustrated embodiment, wherein its cross section widens in the direction towards the support part pivot axis 8, i.e. in the direction in which the stand-up lever arrangement 42 functioning as an adjustment element is moved when being adjusted from the starting into the end position.

According to the respective structural conditions and requirements, the guide element 52 can also be shaped in such a way that its cross section widens at least in portions in a curved or ramp-like manner. Any combination of curved and straight cross-sectional portions is also possible. The kinematics of the adjustment movement are defined by the cross-sectional shape of the guide element 52. This also applies both to the previously explained embodiments and the further embodiments of the invention explained in more detail below.

The stand-up lever arrangement 42 functioning as an adjustment element is guided in a linear guide 30 formed by the U-profile of the longitudinal spar 18 in a manner corresponding to the embodiment according to FIGS. 1.1 to 1.9.

Starting from the initial position of the adjustment movement shown in FIG. 4.4, the furniture drive (electromotive drive unit) assigned to the adjustment element is actuated in such a way that the stand-up lever arrangement 42 in the linear guide 30 moves to the right in the drawing when in its flat position. Here, the free end of the second stand-up lever 2 passes under the stroke guide element 52, so that the stroke quide element is pivoted about the support part pivot axis 8 in the clockwise direction in the drawing. As a result, the support part 6 is pivoted relative to the base part 4 in the desired manner. Because the free end of the second stand-up lever 50 passes under the stroke quide element 52 at the beginning of the adjustment movement, the dead center is overcome when the support part 6 is adjusted; i.e., the dead center is passed.

At the end of the first kinematic phase, the free end of the second stand-up lever 50 runs against the end of the linear guide 30 functioning as a stop, so that the stand-up levers 44, 50 pivotably move into the stand-up position about the second pivot axis 2 relative to one another, whereby the support part 6 continues to pivot about the support part pivot axis 8 until the end position of the adjustment movement shown in FIG. 4.1 is reached.

As can be seen in particular from FIG. 4.5, a roller arrangement 54 can be provided at the free end of the second stand-up lever 50 in order to reduce the friction of the stand-up lever arrangement 42 in the linear guide 30.

In FIG. 5.1 and FIG. 5.2, a modification of the previous embodiment is shown, which modification differs from said previous embodiment in that the stand-up levers 44, 50 have a greater length. In this way, the pivoting range during the pivoting adjustment of the support part 6 relative to the base part 4 is increased and the load on the electromotive drive unit is reduced. FIG. 5.1 shows the support device 2 in the end position of the adjustment movement, while FIG. 5.2 shows the support device 2 in the unadjusted initial position of the adjustment movement.

In FIGS. 6.1 to 6.5, a further modification of the embodiment according to FIG. 4.1 to FIG. 4.5 is shown, which differs from said previously shown embodiment in that the electromotive drive unit 10 is not based on the functional principle of a Bowden cable, but rather on the functional principle of a spindle drive.

The electromotive drive unit 10 has an electric motor 56 which is in rotary drive connection via a worm gear with a rotatably mounted threaded spindle on which a spindle nut 58 is arranged so as to be non-rotatable and movable in the axial direction. Corresponding spindle drives are generally known to a person skilled in the art of furniture drives and are therefore not explained in more detail here.

The spindle nut 58 is connected to the stand-up lever arrangement 42 via tabs 60, 62 which extend in the longitudinal direction of the linear guide 30 and which can be formed, for example, by sheet metal strips and between which the threaded spindle is received.

Starting from the initial position of the adjustment movement shown in FIGS. 6.4 and 6.5, the electric motor 56 drives the threaded spindle in such a way that the spindle nut 58 moves to the right in the drawing. The pivoting adjustment of the support part 6 relative to the base part 4 takes place in two successive kinematic phases, as has been explained for the embodiment according to FIGS. 4.1 to 4.5.

Because the Bowden cable drive has been replaced by a spindle drive, the rigidity of the drive train 26 is improved substantially.

It is apparent to a person skilled in the art that a Bowden cable drive can be replaced with a drive with a spindle drive both in the embodiments described above and in the embodiments explained in more detail below.

A further embodiment of a support device 2 according to the invention using a lever arrangement is shown in FIGS. 7.1 to 7.4. In the illustrated embodiment, the lever arrangement has an individual lever 66 pivotably mounted on the base part 4 about a stationary lever pivot axis 64, the free end of which carries a roller 68 (see FIG. 7.3) on which the underside of the support part 6 loosely rests.

A guide element 52 is attached to the underside of the lever 66 and, in order to adjust the support part 6 relative to the base part 4, interacts with an adjustment element which, in this embodiment, is designed as a roller carriage 68 (see FIG. 7.4). The roller carriage 68 has rollers 70, 72 on its side facing the linear guide 30, on which it runs in the linear guide 30. On its side facing the guide element 52, the roller carriage 68 has a further roller 74 with which the roller carriage 68 comes into contact with the guide element 52 during the adjustment movement.

As can be seen from FIG. 7.4, the guide element 52 has an elongated, wedge-like contact surface that widens in cross section towards the lever pivot axis 64.

The roller carriage 68 is connected to a movable part of a Bowden cable of a Bowden cable drive.

FIG. 7.1 shows the support device 2 in the end position of the adjustment movement, while FIGS. 7.2 to 7.4 show the support device in the initial position. Starting from this initial position, the Bowden cable drive is actuated in such a way that the roller carriage 68 in the linear guide 30 is pulled to the left in the drawing. Here, the roller carriage 68 moves under the guide element 52, so that the lever 66 is pivoted counterclockwise in FIG. 7.1. As a result, the support part 6 lying loosely on the free end of the lever 66 is pivoted clockwise until the end position of the adjustment movement shown in FIG. 7.1 is reached.

In FIGS. 8.1 to 8.5, a modification of the previous embodiment is shown, which modification differs from said previous embodiment in that, instead of a Bowden cable drive, a spindle drive 57 with a spindle nut 58 is provided, which spindle nut is arranged on a threaded spindle 76.

FIG. 8.1 shows the support device 2 in the end position of the adjustment movement, while FIGS. 8.2 to 8.5 show the support device 2 in the initial position of the adjustment movement. For illustrative purposes, various components of the support device 2 are omitted in FIGS. 8.2 to 8.4. FIG. 8.5 shows the guide element 52 used in the embodiment on its own.

It can be seen in particular from FIG. 8.4 that the lever 66 has two parallel lever parts 78, 80 (tabs) which are spaced apart from one another in the radial direction of the threaded spindle 76 and between which the threaded spindle 76 is guided during the adjustment movement.

A further embodiment of a support device 2 according to the invention is shown in FIGS. 9.1 to 9.8.

FIGS. 9.1 to 9.3 each show the support device 2 in a perspective view in various adjustment positions.

FIG. 9.1 shows the support device 2 in an initial position of the adjustment movement, in which the support part 6 rests flat on the base part 4, while FIG. 9.3 shows the support device in an end position of the adjustment movement. FIG. 9.2 shows the support device in an intermediate position of the adjustment movement.

FIG. 9.4 shows the support device 2 in the end position of the adjustment movement in a perspective view of the rear side of the support part 6.

FIG. 9.5 shows the support device 2, wherein the support part 6 is omitted to illustrate the interaction of the second stand-up lever 50 with the guide element 52.

FIG. 9.6 shows, in the same representation as FIG. 9.5, but on an enlarged scale compared to FIG. 9.5, a detailed view in the region of the guide element 52.

The drive device 10 has a drive housing 82 consisting of half-shells, to which struts 84, 86 are connected, with which the support device 2 is supported on a base when in use and which extend transversely to the longitudinal direction of the support device 2. The struts 84, 86 can be molded onto the drive housing 82 or formed by separate components connected to the drive housing 82.

It can be seen that the configuration of the stand-up lever arrangement 42 corresponds to that of the embodiment according to FIGS. 5.1 and 5.2.

In accordance with the embodiment according to FIGS. 8.1 to 8.5, the drive unit 10 has a spindle drive 57.

In FIG. 9.7, an upper half-shell of the drive housing 82 has been omitted in order to illustrate the structure of the drive unit 10 in more detail.

In FIG. 9.8, the electric motor 56 is omitted in order to illustrate the structure of a gear unit arranged downstream of the electric motor 56 in the drive train. The output shaft of the electric motor 56 is designed as a worm which is in engagement with a first worm gear 88 which is non-rotatably connected to a first spur gear 90. The output shaft of the electric motor 56 is also in engagement with a second worm gear 92, to which a second spur gear 94 is non-rotatably connected, which is in engagement with the first spur gear 90. The threaded spindle 76 is non-rotatably connected to the second worm gear 92 and the second spur gear 94. Any other transmission can also be used, depending on the respective requirements and circumstances.

The support device according to the invention has a simple and robust structure and is suitable for applying high adjustment forces.

When the support device is used, upholstery of a piece of furniture for sitting and/or lying on, for example a mattress of a bed, can be supported directly on the support part 6. However, it is also possible to motorize a manually adjustable slatted frame by means of a support device according to the invention, for example, by inserting a support device according to the invention between an adjustable support part of the slatted frame, in particular a head part of the slatted frame, and a mattress.

The support device according to the invention can be used both in the nursing care sector and in the home environment.

The kinematics of the adjustment movement can be selected within wide limits according to the respective requirements and circumstances by appropriate design of the stand-up lever arrangement, in particular with regard to the length of the stand-up lever of the stand-up lever arrangement and the guide element, in particular with regard to its shape.

The invention claimed is:

1. A modular support device for retrofitting a bed, the support device being adjustable by an electric motor for supporting a mattress of a bed, and the support device being flat, the support device comprising:

a base part; with a support part which is connected to the base part so as to be pivotable about a support part pivot axis and with an electromotive drive unit which is in operative connection with the base part and the support part for the pivoting adjustment of the support part relative to the base part and has an output member;

the base part and the support part are designed in such a way and in operative connection with the drive unit in such a way that the support part can be adjusted between an unadjusted initial position in which the support part rests flat on the base part and an end position of the adjustment movement in which the support part is arranged at an angle to the base part; the base part and the support part in the initial unadjusted position being adjacent to each other and maintaining the support part flat;

the drive unit has at least one drive train by means of which the drive unit is in drive connection with an adjustment element, the adjustment element is fixed to the base part, the adjustment element is translationally movable along a linear axis, in such a way that the adjustment element is movable by means of the drive unit between an initial position which corresponds to the unadjusted initial position of the support part, and an end position which corresponds to the end position of the adjustment movement;

a stand-up lever arrangement is arranged in the drive train between the base part and the support part, the stand-up lever arrangement has a first stand-up lever, one end of which is articulated and connected to the output member or a component connected there to about a first articulation axis and the other end of which is articulated and connected to a second stand-up lever about a second articulation axis, the free end of which is in operative connection with a wedge-like guide element assigned to the support part and facing towards the base part, the wedge-like guide element is arranged on the support part in the region of the support part pivot axis, wherein the wedge-like operative connection between the second stand-up lever and the wedge-like guide element is designed such that, starting from the initial position of the adjustment movement wherein to adjust the support part relative to the base part, the adjustment element interacts with the wedge-like guide element and is moved translationally relative to said wedge-like guide element in a first kinematic phase, the first and second stand-up levers execute a translational movement when they are in a dead center in their flat position, the wedge-like guide element and the support part are in a dead center, and wherein the free end of the second stand-up lever interacts with the wedge-like guide element to pivot the support part upwardly relative to the base part and the dead center is passed; and in a second kinematic phase, the free end of the second stand-up lever runs against a stop so that the first and second stand-up levers pivotably move into the stand-up position about the second pivot axis relative to one another, whereby the support part continues to pivot about the support part pivot axis relative to the base part until the end position of the adjustment movement of the support part is reached.

2. The modular support device according to claim 1, wherein the electromotive drive unit is designed in such a way and is in operative connection with the adjustment element in such a way that when the drive unit is actuated, the adjustment element is moved translationally along its linear axis to adjust the support part relative to the base part.

3. The modular support device according to claim 1, wherein the drive unit has at least one Bowden cable, which is in operative connection with an electric motor, with a sheath and a pull cable received in the sheath, a movable part of which is in operative connection with the adjustment element for translational movement of said adjustment element along the linear axis.

4. The modular support device according to claim 1, wherein the wedge-like guide element is designed or shaped in such a way and is in operative connection with the adjustment element in such a way that the support part is pivoted about the support part pivot axis relative to the base part during a relative translational movement between the adjustment element and the wedge-like guide element.

5. The modular support device according to claim 1, wherein at least one wedge-like guide element has a cross section which widens at least in portions along a linear axis of the adjustment element.

6. The modular support device according to claim 1, wherein the wedge-like guide element is shaped in such a way that its cross section widens along the linear axis in such a way that the adjustment element is in contact with a portion of the wedge-like guide element having a smaller or minimum cross section in the region of the initial position of the adjustment movement and is in contact with a portion of the wedge-like guide element having a larger or maximum cross section in the region of the end position of the adjustment movement.

7. The modular support device according to claim 1, wherein at least one wedge-like guide element is shaped in such a way that its cross section widens at least in portions in a curved or ramp-like manner.

8. The modular support device according to claim 1, wherein the adjustment element is guided along the linear axis in a linear guide formed on the base part.

9. The modular support device according to claim 8, wherein the stand-up lever arrangement is guided in the linear guide.

10. The modular support device according to claim 1, wherein the wedge-like guide element has a cross section which is smaller in a region of the initial position of the adjustment movement and a larger cross section in a region of the end position of the adjustment movement.

* * * * *